(12) United States Patent
Alley

(10) Patent No.: US 11,754,347 B2
(45) Date of Patent: Sep. 12, 2023

(54) MULTIPLE CHANNEL HEAT EXCHANGER

(71) Applicant: Tony Alley, El Dorado Hills, CA (US)

(72) Inventor: Tony Alley, El Dorado Hills, CA (US)

( * ) Notice: Subject to any disclaimer, the term of this patent is extended or adjusted under 35 U.S.C. 154(b) by 117 days.

(21) Appl. No.: 17/509,291

(22) Filed: Oct. 25, 2021

(65) Prior Publication Data
US 2022/0252357 A1    Aug. 11, 2022

Related U.S. Application Data

(60) Provisional application No. 63/069,242, filed on Aug. 24, 2020.

(51) Int. Cl.
*F28D 20/02* (2006.01)
*F24D 11/00* (2022.01)
*F24D 11/02* (2006.01)
*F24F 12/00* (2006.01)

(52) U.S. Cl.
CPC .......... *F28D 20/021* (2013.01); *F24D 11/001* (2013.01); *F24D 11/02* (2013.01); *F24F 12/00* (2013.01)

(58) Field of Classification Search
CPC ...... F24D 11/02; F28D 20/021; F28D 7/0083; F24F 12/00
See application file for complete search history.

(56) References Cited

U.S. PATENT DOCUMENTS

2019/0242657 A1 *  8/2019  Ignatiev .................... F28D 7/16

* cited by examiner

*Primary Examiner* — Lionel Nouketcha

(57) ABSTRACT

A system including a heat exchanger with two or more channels is provided. The system includes means for one or more source channels and one or more load channels. The source channels and load channels are enclosed for containing and channeling a heat-bearing fluid through the heat exchanger. The source channels and load channels are integrated as components of complete source circuits and load circuits with the purpose of conveying the heat-bearing fluids between heat/cold loads and the heat exchanger. The system also includes means for providing thermal storage that may be used for sensible heat storage, latent heat storage, or a combination of sensible heat storage and latent heat storage. Within the system there are means for putting the source channels, load channels and thermal storage means in intimate thermal communication with one another for the purpose of exchanging heat in all flow-directions.

13 Claims, 16 Drawing Sheets

MULTIPLE CHANNEL HEAT EXCHANGER

CROSS-REFERENCE TO RELATED APPLICATIONS

The present Utility patent application claims priority benefit of the [U.S. provisional application for patent Ser. No. 63/069,242, entitled "Thermal Energy Storage Utilizing Multi-Flow Heat Exchanger with Multi-Media", filed on 24 Aug. 2020 under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to thermal storage and heat exchanger systems. More particularly, certain embodiments of the invention relate to integrated multi-flow heat exchangers and thermal storage systems incorporating such heat exchangers.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Thermal storage systems typically store thermal energy by heating or cooling a storage medium so that the stored energy can be used at a later time for various applications including, without limitation, heating and cooling applications and power generation. Current methods of thermal storage are often complex and utilize various components such as, but not limited to, pumps, piping, and conventional heat exchangers. This complexity can cause such systems to be expensive, with the expenses resulting from the manufacturing of the many components, the complexity of installation, the added engineering needed for this complexity, and, in the case of an open system where water is being used directly from a storage tank, the added maintenance required for an open system.

By way of educational background, an aspect of the prior art generally useful to be aware of is that current methods being used for thermal storage include sensible heat storage and latent heat storage. In sensible heat storage, a substance's temperature is raised or lowered so that heat/cold is stored by changing the temperature of the mass of a substance. For example, water may be cooled or heated in large tanks and then pumped to various heat exchangers to condition a space or substance. This method typically requires a lot of space for the massive storage media needed for sensible thermal storage. Since conventional sensible heat storage systems are typically open systems, meaning the same water in the tank being used as the heat storage is also being pumped through the system to fans and heat exchanger coils, one can expect that these systems will require a good deal of maintenance to constantly monitor and regulate the water quality to prevent the water from getting dirty and fouling the inside of the components that carry water to/from fans, coils or any other heat exchanger components. In latent heat thermal storage, a heat/cold storage medium changes phase, for example from solid to liquid or liquid to vapor, to absorb or emit heat. Latent heat thermal storage typically requires less storage mass than sensible heat storage because the storage medium can absorb/emit more heat per pound of media storage than the simple sensible heat of temperature change. Water has been used successfully in phase change from solid (ice) to liquid and liquid to vapor (steam) in latent heat thermal storage systems. Various other compounds have also been utilized in latent heat thermal storage systems that change phase at a temperature that is desirable for that application, for example, paraffin wax can change from a solid to a liquid at 115° F. to 145° F. and can be used to store latent heat for heating homes and any human occupied space.

The following are examples of latent heat methods in which ice is used as the storage medium wherein the phase change occurs when the ice is solidified (frozen) and liquified (melted) in order to facilitate the emission and absorption of heat. The first example is a system using ice-on-tube, external melt with refrigerant circulating directly in tubes that are immersed in the storage medium. Of current methods of latent heat thermal storage, this is a method that is lower in complexity. In this system, a plurality of tubes is immersed in the water acting as the storage medium. These tubes act as a heat exchanger wherein the refrigerant within the tubes is evaporating and thereby removing heat in the tubes and freezing the water. Not all of the water is frozen so that the water itself that is in the storage tank may be circulated through the tank and then circulated to the load to be cooled. The ice melts from the outside because the warm water that is being circulated to the load melts the ice that is on the tubes from the outside of the ice on the tubes. Therefor it is called external melt. This method allows for the storage medium to be directly used to cool the load without the need for an extra heat exchanger to chill an antifreeze mixture that then freezes the water. This is an open fluid circuit, which is typically a maintenance intensive system. The water in the storage tank is subject to contaminates, microbial growth, insects, algae etc. all of which can be pumped into the load heat exchangers (e.g., water-to-air coils, radiant surface coils, etc.), which can lead to issues within the system. It is also believed that this type of system cannot be used with two or more phase change materials simultaneously. Another exemplary latent heat storage method is an ice-on-tube external melt system using an antifreeze mixture. In this method a chiller cools the antifreeze mixture in an evaporator, for example a refrigerant-to-glycol heat exchanger, then the antifreeze liquid goes through a heat exchanger in a storage tank to cool and freeze the water in the tank. This method involves an extra heat exchanger compared to the previous example as there is the heat exchanger to freeze the water in the storage tank as well as a heat exchanger to cool the antifreeze liquid, which does add to the complexity of the system. This system works similarly to the above example except that an antifreeze liquid, such as a glycol mixture, is chilled below the freezing point of water and is then circulated through a plurality of tubes in the storage tank which in turn freezes the water but typically not all of the water. Again, this system is an open circuit where the water in the tank is directly used and is pumped through the load heat exchangers and can become contaminated and foul the load heat exchanger without constant maintenance. Yet another current method is ice-on-tube internal melt in which there is a heat exchanger inside the storage tank consisting of a plurality of tubes of plastic material through which an antifreeze (glycol) mixture is circulated after it is chilled in a chiller to freeze the water in charging mode (ice make mode). In discharge mode (ice melt mode), the glycol mixture is reversed to being circulated through the storage tank heat exchanger and pumped to the load. During the ice melt (discharge mode) the warm glycol that is circulated to the load starts to melt the ice from the inside nearest to the tube so the ice melts from the inside, therefor it is called internal melt. This is a closed system and therefor has reduced maintenance. However, this system is very complex for piping and installation. One prior art method uses both internal melt and external melt. This system comprises two heat exchangers, a heat exchanger in the storage media and another heat exchanger through which the water from the tank is pumped to cool refrigerant that is being pumped to the load. This is a highly complex system that needs a refrigerant management software system.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 12A shows the three plates in the process of being combined to form the multi-channel conduit, and FIG. 12B shows the multi-channel conduit fully assembled;

FIG. 13A is a cross sectional view, and FIG. 13B is a side view;

FIG. 14A is a side view, and FIG. 14B is a front view of an open ends of three multi-channel conduits arranged in a configure appropriate for this application.

Figure 1:
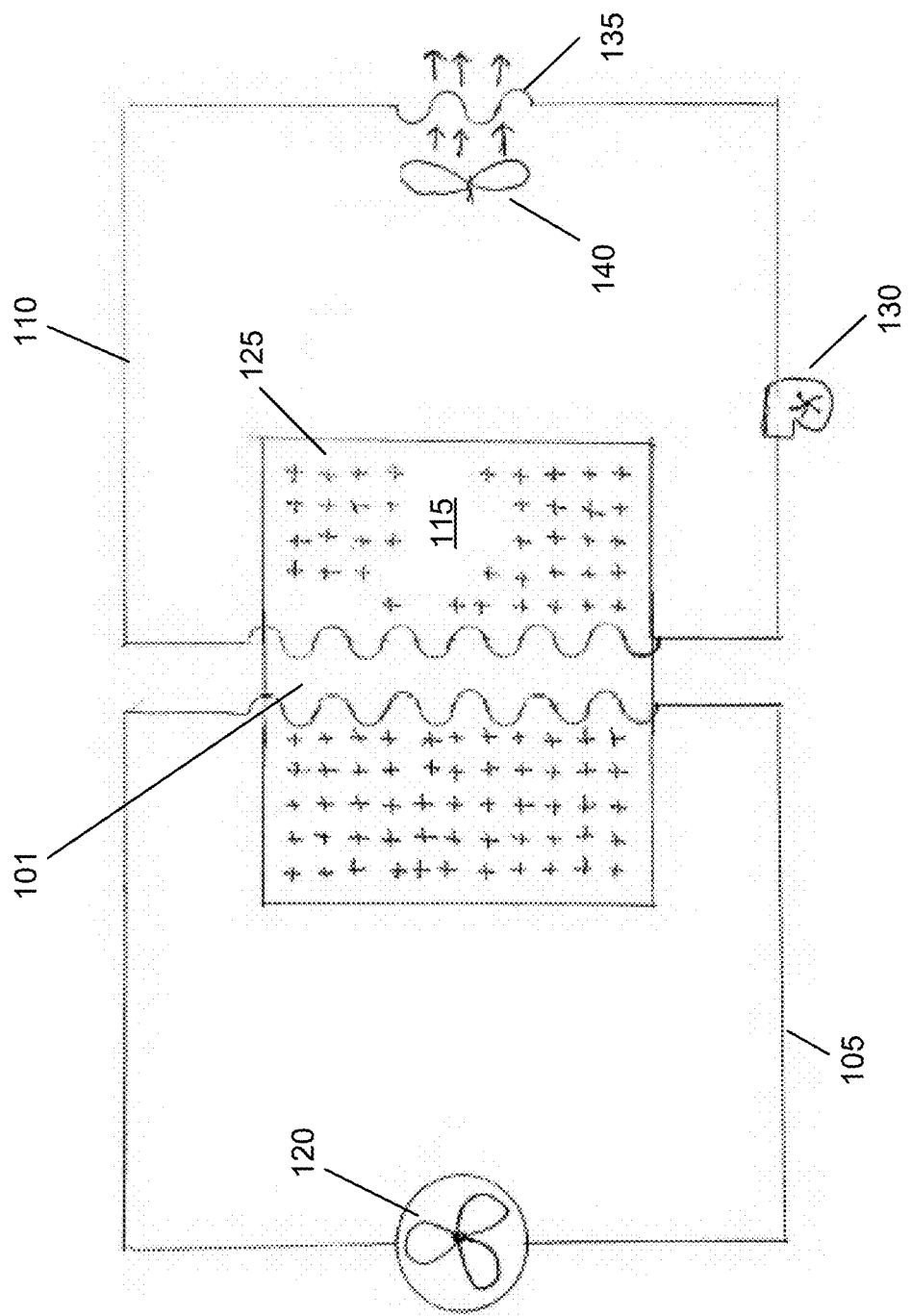
FIG. 1 is a diagram of a multi-flow heat exchanger in use in an exemplary thermal storage application, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred, or induced by any pattern(s) of description, embodiments, examples, or referenced prior-art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s). Furthermore, any statement(s), identification(s), or reference(s) to a structure(s) and/or element(s) that corresponds to and/or supports a claim limitation(s) phrased in functional limitation terms covered by 35 USC § 112(6) (post AIA 112(f)) should be understood to be identified by way of example and not limitation, and as such, should not be interpreted to mean that such recited structure and/or element is/are the only structure(s) and/or element(s) disclosed in this patent application that corresponds to and/or supports such claim limitations phrased in functional limitation terms. This claims interpretation intention also applies to any such subsequent statements made by Applicant during prosecution.

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

The following paragraphs [0076-0104] define some specific terms that will be used in the following detailed description.

Fluid is herein used to describe any substance that can flow. Liquid and vapor are both included in this definition as in a multi-phase substance that may undergo phase change back and forth from a liquid to a vapor because both fit the definition of "any substance that can flow". The word "Fluid" as defined herein may also include a slurry which is a liquid with small solid particles that can go through phase change between solid and liquid. The multi-flow heat exchanger design according to embodiments of the present invention typically allows for a versatility of fluids to be used. However, it is contemplated that the preferred fluid would be a multi-phase fluid undergoing phase-change because of the enhanced capacity for heat exchange. For comparison, a pump can impel 1 pound of liquid water for sensible heat transportation with a 10 degree change in temperature that can transport 10 btus of heat, or the pump can impel 1 pound of a multi-phase fluid, atypical synthetic refrigerant in this example, which can transport 90 btus of heat. If ammonia is used 1 pound of refrigerant can transport over 500 btus of heat. If water is used as a multi-phase fluid for latent (not as liquid for sensible heat) about 1000 btus of heat can be transported by simply pumping 1 pound of water. Air also fits the definition of fluid because it can flow. Air may be used in the multi-flow heat exchanger designs. Air is less efficient than many other multi-phase fluids at btu transportation but has the added advantage of simplicity in that the air can be supplied directly to a conditioned space with no further heat exchanger needed such as a fan coil or radiant surface. One may expect that there are considerable advantages to the versatility of embodiments of this multi-flow heat exchanger being able to utilize various fluids (e.g., liquid, gas, multi-phase, slurries, etc.)

Channel is defined as: a) any means of passage b) a course through which something moves or is transmitted, conveyed, expressed, etc. Variations of channels for a fluid in embodiments of the present invention are numerous including, but not limited to, tubes and channels made by two plates fastened together. Basically, any physical device that can contain and direct the flow of any fluid could be a channel. Because the device can be used to channel fluid(s) it is defined as a channel. A tube is merely an embodiment of the concept of the word "channel", and the word "channel" is expressly being defined herein as it is defined in a standard dictionary, for example, "a) any means of passage b) a course through which something moves or is transmitted, conveyed, expressed, etc." Therefore, one cannot limit one's understanding of the word "channel" to "tube" or "pipe" or even to "two pieces of sheet metal welded together". In fact, Oxford Concise Dictionary defines channel as a "course through which anything moves". There are practically infinite methods to make a "course through which anything moves" including, but not limited to, the blood veins in our bodies, nerves that electrical impulses move, gutters in the street, a tap for a keg of beer, or the whole in the bottom of Titanic. These are all "channels" however made and in whatever form they may be. See FIGS. 2 and 6 through 15 as examples of various configurations of channel arrangements.

Circuit is defined as the complete route through which a fluid can circulate. The channels in the Multi-Flow Heat Exchanger each form a part of the individual circuits. A circuit forms a complete loop from the source of heat/cold through the channel that is within the Multi-Flow Heat Exchanger or a loop through the channel within the Multi-Flow Heat Exchanger to/from the load heat exchanger. Separate fluids are circulated in the individual circuits.

Heat is defined as the addition of thermal energy flowing from what is considered to be the source or cause point of creating heat energy, and cold is defined as the removal of thermal energy toward what is considered to be the source or cause point of creating absence of heat.

Heat source/cold source may be any heat/cold creating method. Examples of heat creating methods including as examples boilers, thermal solar panels, heat pumps, waste heat form manufacturing processes, waste heat from combustion engines, etc. Examples of cold creating methods may include, without limitation, refrigerant chillers, absorption chillers, utilization of outside ambient air, water or ground water, evaporative cooling, radiating heat to outer space as in night-sky radiance, etc.

Source circuit is defined as the complete circuit, including the channel through the multi-flow heat exchanger, that a fluid is contained and is being circulated through the multi-flow heat exchanger from the source/cause of heat/cold. The source circuit heats/cools the storage medium and/or other circuits by transporting heat/cold from/to the source/cause. The same physical circuit can be switched at different times from being utilized as a source circuit to being utilized as a load circuit. A typical source circuit may supply 100 to 150 degrees Fahrenheit of heat for human heating needs and 20° F. as a cold source to make ice for human cooling needs. However, source circuits may supply a wide range of temperatures for a broad variety of applications. For example, without limitation, a source circuit can supply −40° F. or colder to freeze a phase change material (PCM) for cold storage or 1000° F. or higher for storing heat in a PCM for industrial processes or for boiling water for driving a steam engine.

Load is defined as the target of the cooling or heating that is being done by the source circuit. Examples of loads may include, without limitation, the heat that is being removed from a conditioned space, the heat that is being removed to make ice, a cold conditioned space that needs to be heated, the heat needed for a conditioned space, the heat needed to boil water to drive a turbine or for an industrial process, etc. These are just examples of the near infinite uses for which heat/cold may be utilized.

Load circuit is defined as the complete circuit, including the channel in the multi-flow heat exchanger, through which a fluid is being circulated to heat/cool a load. The load circuit circulates a fluid between the multi-flow heat exchanger and a load. Heat is removed for cooling the load or added for heating the load in the multi-flow heat exchanger and then circulated to the load where the fluid absorbs heat for cooling or gives off heat for heating. The same physical circuit can be utilized as a load circuit at one time and switched to a source circuit at a different time.

Multi-Channel Conduit is defined as a device for facilitating the flow of two or more fluids that are contained in discrete and completely separate channels. In such as device, the separate fluids may not intermix, but the heat carried by the fluids may intermix. A Multi-Channel Conduit can be made using various different methods and may be configured as various different embodiments.

Multi-Flow Heat Exchanger is defined as a heat exchanger that utilizes two or more channels in a Multi-Channel Conduit to exchange heat between two or more fluid channels AND can simultaneously exchange heat with the storage medium that it is situated within.

Integrate is defined as "complete (imperfect thing) by addition of parts; combine (parts) to make a whole" (Oxford Concise Dictionary). For example, a house in Alaska that did not have glass in its window openings, no doors, and no roof this would most likely be considered an imperfect thing. This imperfect house may be completed by the addition of parts (i.e., windows, doors, and a roof) to make it a whole house. In relation to embodiments of the present invention, two or more heat exchangers may be integrated into one to make it one whole heat exchanger, which may result in greater efficiency, greater economization, and greater simplicity for installation. This is integration to make a whole.

Integrated Heat Exchanger is defined as a heat exchanging means integrating (combining) two or more heat exchangers into one heat exchanging system. Integrated Heat Exchangers according to embodiments of the present invention may be able to provide simplification and higher energy efficiency. Even though the efficiency may be higher there may also be higher economization in upfront costs in installation.

Source/Load Circuit is defined as a circuit that is being simultaneously utilized as both a source circuit and a load circuit. In the following description Examples E and D referencing FIG. 5 and FIG. 4, respectively, comprise examples of combined Source/Load circuits.

Direct Cooling or Heating is defined as when the source circuit (either heat or cold) directly cools or heats the load circuit without the aid of the storage medium.

Dominant Source Circuit is defined as a circuit that is powerful enough to cool the storage medium and another load or multiple load circuits simultaneously. Even though this circuit is dominant, because of the system's Stable Equilibrium, the system will typically function efficiently.

Dominant Load Circuit is defined as a circuit that can remove more heat from the load than the source circuit can remove, which results in both the source circuit and the storage medium being utilized to cool the dominant load circuit. Even though there is a dominant load circuit, because of the system's Stable Equilibrium, the system will still function efficiently.

Storage Medium is defined as any substance that may be used to store thermal energy, either cold or hot storage. This substance can be a solid or liquid or gas for sensible heat storage or may be a solid-to-liquid, a liquid-to-gas or, like $CO_2$, a solid-to-vapor for phase change (latent heat) storage.

Multi-Media Storage method is defined as a storage method where two or more media are utilized. The multiple media may be either simultaneously combined into one mass that is not removed and replaced as the need changes or be utilized alternately as multiple separate masses that are removed and replaced as the need changes. For example, in the alternate utilization, water may be used as a cooling storage medium for summer because it has a phase change temperature of 32° F., which is convenient for comfort cooling. Then, when the season changes, the water can be drained for winter and a PCM may be installed that has a phase change temperature of 130° F. which is convenient for comfort heating in winter.

Equilibrium is defined as a state of balance or equality between opposing forces. For example, in heating and cooling when the heating source of a conditioned space is providing the same amount of heat as the load (the conditioned space) needs, this state is the state of equilibrium. The two opposing forces are the same. The building is losing heat at the same rate that the furnace is supplying heat. This is equilibrium. Most furnaces are designed to supply enough heat for the coldest day that is expected for that climate.

Unstable Equilibrium is defined as a state in which the balance is disturbed and tends to move out from equilibrium. In the above example for a building with comfort heating needs, the reality is that most days are not at the coldest, so if the furnace were to work at full capacity it would overwhelm the building, and this building would likely get too hot. This would not be equilibrium. One force, the furnace, would be stronger than the other force, the load, or the heat being lost from the building. In other words, the load would be less than the heat being supplied by the furnace. This is called unstable equilibrium. The solution is that the furnace that is too powerful turns off and on to allow time for the smaller force, the heat loss from the building, to catch up so the system can achieve equilibrium. This works, but it tends to wear out the furnace sooner. Another solution is to vary the output of heat from the furnace. This works but the disadvantage is the need for sophisticated controls which add considerable expense and are liable to operational failure.

Stable Equilibrium is defined as a state in which the balance, when disturbed, tends to return to equilibrium. In the heating needs for a building, the heat loss from the building is the same as the heat that is being supplied by the furnace when the system is in stable equilibrium. A thermostat's function is to cause stable equilibrium for a furnace in the heat loss of a conditioned space compared to the heat that is being gained for the building or for cooling the heat that is gained in the conditioned space compared to the heat that is being removed by the air conditioner. This is achieved by most conventional thermostats by the thermostat turning the furnace or air conditioner off and on to achieve Stable Equilibrium, which is to say that the two forces, the heating input from the furnace matches the heating loss of the building. "Therm" in "thermostat" means heat and "-stat" means "an instrument or agent that keeps something stable or stationary". Also, there are currently in use sophisticated thermostats and controls that can vary the heat input from a furnace and achieve stable equilibrium of the conditioned space in this way. The point is that stable equilibrium is the desired objective of engineers and a benefit for building occupants, and much effort and engineering work has been given to this objective of stable equilibrium for the control of temperature.

Heat Storage Medium is defined as any substance that can be used to store heat/cold either for sensible heat storage or for latent heat storage Sensible Heat is defined as thermal energy whose transfer to or from a substance results in a change of temperature. Sensible heat is called sensible heat because the addition or removal of heat can be sensed.

Latent Heat is defined as heat given off or absorbed in a process (such as fusion or vaporization) other than a change of temperature.

Sensible Heat Storage is defined as using a storage medium to lower or raise its temperature to store heat/cold.

Latent Heat Storage is defined as using a storage medium to change its phase to absorb/give off heat such as fusion (melting), solidifying (freezing or becoming solid), evaporating, or condensing for the purpose of storing heat.

Charging Mode is defined as adding/removing either latent or sensible heat to the storage medium for the purpose of using the heat/cold for a latter use. For example, freezing water to store cold which can later be melted to remove heat from a conditioned space. When ice is the storage medium, this specific mode may also be called ice-make mode. Charge mode also includes adding heat, for example, melting paraffin wax at 130° F. that can be solidified later to give off heat to heat for comfort heating in winter.

Discharging Mode is defined as discharging a previously charged storage medium to give off heat in heating mode and to gain heat in cooling mode. For example, in a system utilizing water as a storage medium in the cooling mode, the storage medium that was previously charged by freezing the water (charging mode) is used to cool the load by melting the ice (discharging mode). In another example utilizing paraffin wax as the storage medium in the heating mode, the paraffin wax is charged by melting the wax and is discharged by solidifying the paraffin wax to give off heat by changing it back to a solid for comfort heating.

Temperature/pressure is defined as the corresponding pressure that causes a refrigerant to change phase at the desired temperature. Changing phase means to change the phase of a substance from vapor to liquid (condense), to change from liquid to vapor (evaporate or boil), to change from liquid to solid (freeze or solidify), or to change from solid to liquid (melt). By controlling the pressure, the temperature at which the phase change occurs can be precisely controlled. For example, water can be used as a refrigerant. Water boiling on the stove typically boils at 212° F. The pot typically does not overheat from the flame as long as there is still water in the pot. The heat from the flame causes the water to change state/phase. The temperature does not change (sensible heat), but the state of liquid changes to the state of vapor water (also known as steam). The water absorbs large amounts of heat as it is converted into steam. This is latent heat. The water changes state but not temperature when heat is removed or added. This means that the temperature of the pot does not rise much over 212° F. because that is the boiling point of water at atmospheric pressure at sea level. However, in the mountains above sea level, water may boil at 190° F. because of the lower atmospheric pressure at the higher altitude. The lower the pressure, the lower the boiling temperature. For example, on Mount Everest the water may boil at 160° F., into orbit/outer space the water may boil at 32° F. Controlling the pressure controls the temperature at which the refrigerant boils. Water is used in some large Manhattan buildings as the refrigerant by lowering the pressure and boiling the water at 35° F. to cool the buildings. Heat flows from warmer to colder. Just like the pot of water on the stove absorbed the heat from the flame because the flame is hotter than 212° F. The warmer 75° F. air in the building will give its heat to 35° F. water that is boiling at 35° F. because 35° F. boiling water is colder than 70° F. air. This cools the inside of the building because the ambient temperature inside the building is above 35° F. Not all refrigerants need to be chemically manufactured. Some are natural refrigerants like water and CO2.

Embodiments of the present invention may provide means for a heat exchanging system for thermal energy storage where two (and for some systems three or more) heat exchangers are integrated into one heat exchanger. In some versions the heat exchanger may be able to integrate multiple discrete fluid channels within the heat exchanger and this heat exchanger is integrated directly into the thermal storage medium(s) by being immersed/situated internally within the storage medium(s). Each fluid channel may be a component of a complete fluid circuit. The fluid that is being contained by each channel is completely independent of the fluid contained in the other channels. The fluids can exchange heat with each other AND can simultaneously exchange heat with various multiple thermal storage substances. Because this heat exchanger is situated/immersed in intimate thermal contact with a substance that is being used as a thermal storage medium, the heat exchanger can inter-exchange heat between any of its fluid channels and/or inter-exchange heat between (one) fluid channel(s) and the thermal storage substance simultaneously. Various embodiments employ a multiple-in-parallel design that is integrated into the thermal storage medium(s). The channels are in parallel with the other channels and in parallel with the storage medium(s). Even though this method is a simplification of some conventional methods, it is believed to result in greater energy efficiency AND lower upfront costs in engineering and installation and materials. Multi-flow heat exchangers in many embodiments are versatile and can be utilized for both latent heat storage as well as sensible heat storage. In sensible heat storage some of these systems may take advantage of stratification in the storage tank. Stratification is where the fluid (storage medium) in the tank tends to separate into strata (layers). The warmer stratum (layer) moves to the top, and the cooler stratum moves to the bottom. In order to beneficially utilize stratification, some multi-flow heat exchangers can be configured with a load channel towards the top of the tank to make it advantageous for a load needing heating and another load channel towards the bottom of the tank for a load circuit that is needing cooling. The closed-circuit/loop nature of these system may also make it more cost-effective regarding maintenance costs. The simplicity of some embodiments may make these systems more user and installer friendly than conventional thermal storage systems, thereby making it more feasible to bring widespread use of thermal energy storage to small tonnage systems (including residential) as well as large tonnage systems. Some embodiments may be configured in cubical shapes as well as circular shapes that may also be stackable to utilize less floor space and more vertical space in relation to the amount of storage medium that can be contained in each container. It is believed that widespread use of thermal energy storage has the potential to alleviate current issues with power supply such as, but not limited to, electrical grid ups-and-downs in demand and the intermittency of power supply from, as an example, photovoltaic or wind power. Widespread thermal energy storage may also help to even out the time-of-use demand for energy for reduced peak power demand.

FIG. 1 is a diagram of a multi-flow heat exchanger in use in an exemplary thermal storage application, in accordance with an embodiment of the present invention. In the present embodiment, the multi-flow heat exchanger comprises a two-channel multi-channel conduit 101, such as, but not limited, to the two-channel multi-channel conduits shown by way of example in FIG. 2, FIG. 6, FIG. 8 and FIG. 9, a source circuit 105 and a load circuit 110. The channels in multi-channel conduit 101 are in parallel with each other and in parallel with a storage medium 115 simultaneously. Storage medium 115 may or may not contain additives to increase its specific heat so that less storage medium stores more heat. Storage medium 115 may comprise a blend or colloidal mixture to enhance thermal conductance within itself. A condenser or heat pump 120 may be connected to source circuit 105 so that source circuit 105 may be used as a refrigerant circuit. A tank 125 contains storage medium 115. Load circuit 110 comprises a pump 130 to pump the fluid within load circuit 110 between storage medium 115 and a heat exchanger 135 in load circuit 110. Heat exchanger 135 is located in or near the load to be cooled. In the present embodiment, heat exchanger 135 is shown along with a fan 140 to aid in the cooling of the load. Those skilled in the art, in light of the teachings of the present invention, will readily recognize that some embodiments may be implemented without a fan, for example in the case of radiant surfaces etc.

Figure 2:
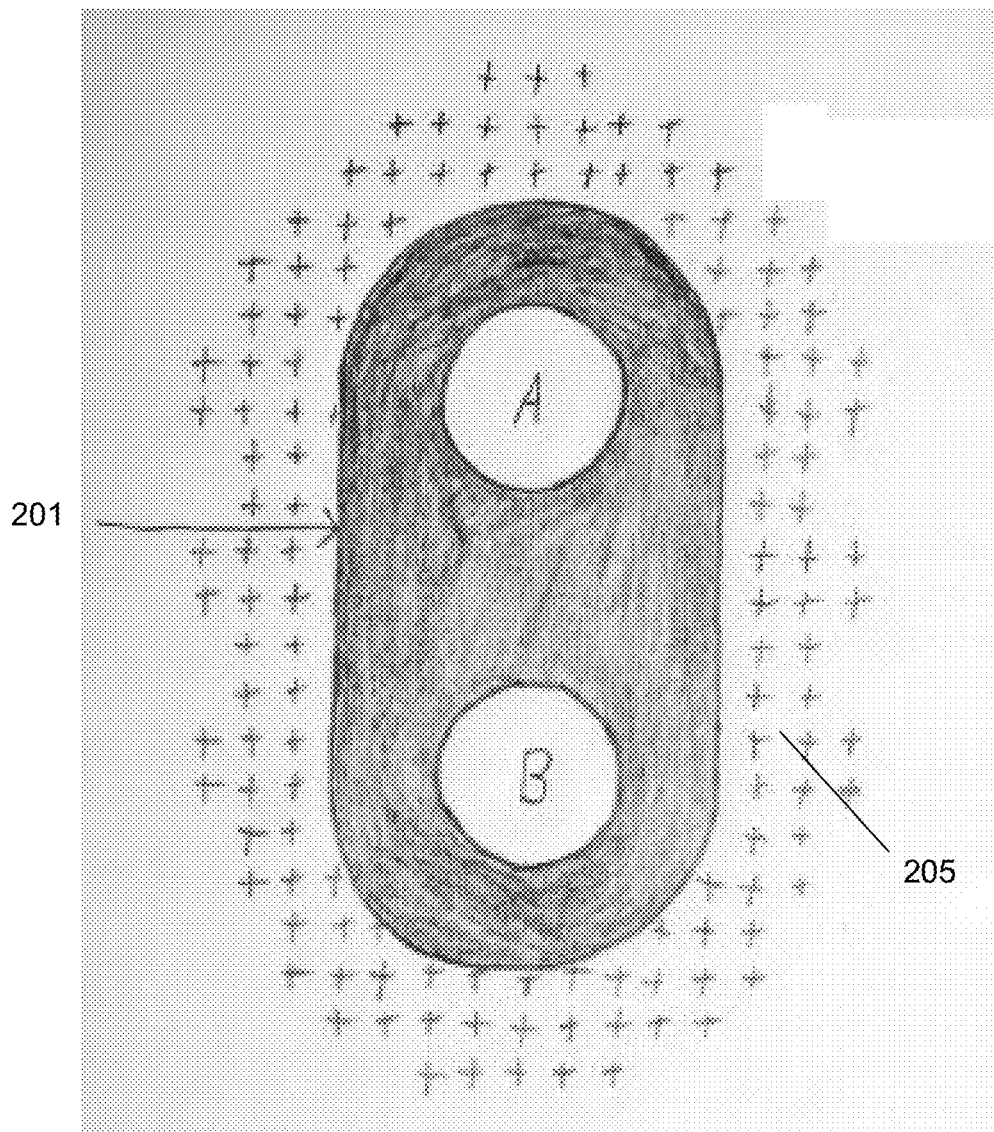
FIG. 2 is a cross-sectional view of a two-channel multi-channel conduit situated in a storage medium, in accordance with an embodiment of the present invention.

FIG. 2 is a cross-sectional view of a two-channel multi-channel conduit 201 situated in a storage medium 205, in accordance with an embodiment of the present invention. In this embodiment, channel A holds one fluid, and channel B holds a separate fluid. It is contemplated that multi-channel conduits may be manufactured in various different configurations and using various different methods. For example, without limitation, multi-channel conduits may be made by soldering two off-the-shelf or specially made tubes together in a parallel configuration, by use of a specially made mold, by extruding one singular piece of metal or plastic that can have two or more discrete channels, by 3-D printing as one piece of material, by forming conjoined pieces of sheet metal where a die forms the channels, etc. The material used to form multi-channel conduit 201 must be able to contain fluid within the channels without leakage within itself between channels to generally prevent the fluids from intermixing and without leakage to the exterior of multi-channel conduit 201. The material must also be able to conduct heat between each fluid in each channel and must function to conduct heat to the surrounding storage medium in which multi-channel conduit 201 is immersed/situated. The material of multi-channel conduit 201 must be able to tolerate repeated thermal expansion and contraction from the changes in temperature from storing heat/cold, must be flexible to tolerate the movement/expansion of ice (if water is the chosen storage medium) without breakage while maintaining longevity. In some embodiments the multi-channel conduit may be configured in a serpentine configuration. These embodiments may require the material to be tolerant of bending preferably without needing to make welded joints but with seamless bent-tube U-turns. Some examples of materials that can be used in various embodiments include, without limitation, copper, cupronickel, aluminum, stainless steel, titanium, etc. In some applications, depending on the fluids and pressure being utilized in the system, synthetic plastics that have heat conducting enhancements added may be utilized. The material must be compatible for the fluid(s) being utilized. Some materials are more or less suitable for specific applications. For example, ammonia must not be used within copper or copper alloys because the ammonia can react with the copper. In another example where the storage medium is to be a salt water, titanium may be the material of choice because salt water has a lower freezing point than fresh water and is also more corrosive. For enhanced thermal conductivity copper could be used and for good conductivity. For systems where weight is a factor, lightweight aluminum could be used. Aluminum can assist in keeping the heat exchanger light for installation with hand trucks. Also, aluminum is typically less expensive than other appropriate materials, so a thicker tube wall can be used for greater durability. The Multi-Flow Heat Exchanger may comprise multi-channel conduits configured into various different configurations for example serpentine, helical, spiral, etc. with or without fins for added heat exchange. If fins are added or the channels have a plate in common that is serving as a fin, see FIGS. 12A-13B and 15, the fin serves to enhance the heat exchange for all channels and the storage medium.

Referring by way of example to FIG. 1 and FIG. 2, the thermal storage system shown comprises a heat exchanger that incorporates two fluid channels in a multi-channel conduit that are a part of distinctly separate fluid circuits, the source circuit, and the load circuit. In alternate embodiments, the multi-channel conduit may comprise more than two channels, as will be described below in further examples. The fluid channels of the multi-channel conduit are disposed to next to each other in a parallel configuration and conjoined to each other along the length of the channels. These conjoined channels form the multi-channel conduit device. The fluids in each channel do not intermix but, the fluids can exchange heat/cold with each other. The exchange of heat/cold is facilitated by making the multi-channel conduit from a thermally conductive material. This heat exchanger is situated/immersed within a medium substance that can store heat/cold so that the multi-flow heat exchanger can exchange heat/cold with the storage medium and simultaneously exchange heat between the fluids in each fluid channel. The exchange of heat/cold may be simultaneously multi-directional and multi-flowing between all channels within the heat exchanger and the storage medium or may exchange heat between any of the channels singularly and the storage medium or may exchange heat/cold selectively between multiple channels and the storage medium. The multi-channel conduit is only a portion of each of the complete circuits, the load circuit, and the source circuit. The multi-channel conduit makes up the part of each circuit that routes the fluid through the multi-flow heat exchanger situated in the storage medium. Once the circuits exit the multi-flow heat exchanger, the load channel(s) and source channel(s) split in order to transport the fluid inside to their respective destinations (i.e., the source(s) or the load(s)) and then back to the multi-flow heat exchanger where the channels are rejoined.

The multi-channel configuration of various embodiments of the present invention may allow for a thermal storage unit that is very versatile and can be utilized for a number of different purposes when heat/cold energy storage is needed. For example, embodiments comprising two channels within the storage medium can exchange heat in minimally 12 different combinations of heat/cold flow and one can expect that even more combinations are possible when there are more than two channels that are utilized within a storage medium. Examples of combinations in a two-channel configuration are as follows:

1) Channel A is the heat source flowing heat to the storage medium which is the load.
2) Channel A is the heat source flowing heat to Channel B which is the load.
3) Channel A is the heat source flowing heat to both the storage medium and Channel A as loads simultaneously.
4) Channel A is the cold source extracting heat from the storage medium which is the load.
5) Channel A is the cold source extracting heat from Channel B which is the load.
6) Channel A is the cold source extracting heat from the storage medium and Channel B loads simultaneously.

The above examples can be reversed so that the functions of Channel A and Channel B are exchanged without physically changing the containment barrier of either channel as follows:

7) Channel B is the heat source flowing heat to the storage medium as a load.
8) Channel B is the heat source flowing heat to Channel A as the load.
9) Channel B is the heat source flowing heat to both the storage medium and Channel A loads simultaneously.
10) Channel B is the cold source extracting heat from the storage medium load.
11) Channel B is the cold source extracting heat from Channel A load.
12) Channel B is the cold source extracting heat from the storage medium and Channel A loads simultaneously.

If three or more channels are incorporated into the heat exchanger so there is a Channel A, a Channel B, and a Channel C, the combinations multiply:

13) Channel A is the heat source to the storage medium load.
13) Channel A is the heat source to Channel B load.
14) Channel A is the heat source to Channel C load.
15) Channel A is the heat source to Channel B and Channel C loads.
16) Channel A is the heat source to Channel B and the storage medium loads.
17) Channel A is the heat source to Channel C and the storage medium loads.
18) Channel A is the heat source to Channel B and Channel C and the storage medium loads.
19) Channel A is the cold source to the storage medium load.
20) Channel A is the cold source to Channel B load.
21) Channel A is the cold source to Channel C load.
22) Channel A is the cold source to Channel B and Channel C loads.
23) Channel A is the cold source to Channel B and the storage medium loads.
24) Channel A is the cold source to Channel C and the storage medium loads.
25) Channel A is the source to Channel B and Channel C and the storage medium loads.

This repeats itself with Channel B and/or Channel C becoming the heat source and again with Channel B and/or Channel C becoming the cold source in all the above combinations. The source channel can be two or more channels adding heat or extracting heat. The storage medium can be the source of heat/cold to heat/cool the load in the discharge mode. Here the storage medium is the source and one or more channels become the load(s). The storage medium can also be used as the load in the charging mode when the medium is heated or cooled by one or more of the channels which become the source.

The various embodiments can be used to store both heat or cold utilizing many storage media substances in the form of latent heat of fusion (solid to liquid phase change) and latent heat of vaporization (liquid to vapor) and sensible heat in many media substances (solid and liquid and vapor of various substances). The fluid substance used to transport the heat/cold into or from the storage media can utilize all-liquid, all-vapor or a multi-phase substance which can be a solid and liquid combination as in a slurry (water with particles of ice or phase change materials (PCM) in it) or a multi-phase substance of liquid and vapor combination that is undergoing phase change and therefor acting directly on the channel walls of the heat exchanger. Some embodiments may be designed for the economization of materials because the main expense of a heat exchanger is creating the required surface area for heat exchange. The more surface area the greater the potential for heat exchange. Since two or more channels are intimately connected for the purpose of exchanging heat with one another and because they can exchange heat between the fluids in each channel via their intimate thermal connectivity, this same intimate connectivity allows the heat to flow from one channel to another channel's or other channels' tube walls resulting in giving it greater surface area with the storage medium that surrounds the conjoined tubes that may not be in use. By intimately conjoining the channels the heat exchanging not only can occur between channels, but the conjoining of the channel walls enhances the surface area of one channel for the purpose of much greater exchanging of heat with the storage medium. For example, a ⅜-inch tube only has a surface area of 0.098 square feet of surface area per linear foot, but if the ⅜-inch tube is conjoined with a ½-inch tube in parallel (each linear foot of the ½-inch tube has a surface area of 0.13 square feet), the surface areas of the two tubes can be added together for a surface area of 0.228 square feet minus the surface area being used to conjoin the two tubes. The efficiency of heat exchange between the fluid in a channel is greatly determined by how much surface area is in contact with the storage medium. This configuration in essence makes the second unused tube into a surface area extender similar to a fin. For example, if the system is in charge mode in this example making ice but not being utilized to cool a load at this point in time, the smaller tube being utilized as the source circuit will utilize the conjoined tube to enhance its heat exchanging with the storage medium that it is immersed within. For example, if the system is in discharge mode only (in this example ice-melt mode) and only a load circuit is being activated, the load circuit will become more efficient in its heat/cold exchanging function with the storage medium because of the enhanced/extended surface area because it is conjoined with another tube that can conduct heat/cold between the fluid in the load circuit and the storage medium.

The following examples of potential applications for multi-flow heat exchangers in accordance with embodiments of the present invention are meant to illustrate real life uses and potential advantages of multi-flow heat exchangers, which may include without limitation versatility. Example A: channels of varying sizes of channels can be combined in a single multi-flow heat exchanger for versatility. Each channel can be sized to fit the engineering needs for the specific fluid circuit in which each channel is operating. In the above example of a ⅜-inch tube conjoined with a ½-inch tube, the ⅜-inch tube may be used as channel A functioning as the source of cold in which the fluid contained within this channel is a refrigerant. It is preferable to keep the refrigerant moving at 900 feet per minute to generally ensure that the oil in the refrigerant does not get stuck in the channel. If the channel is too big, the refrigerant may not be able to maintain the speed needed for it to easily move the oil through the channel. Therefore, it is desirable to size the channel to enable the refrigerant to move fast enough to move the oil but not too small as to restrict the flow of the refrigerant. The engineer can design the size of the tube in channel A independently of other channels for the requirements of that specific channel without concern for the size of the other channel which may have different requirements. The ½-inch channel could contain a different type of fluid such as, but not limited to, another refrigerant or a liquid or even a gas moving through channel B, which is a part of a completely separate fluid circuit. In channel B the engineer typically would not have a concern about oil return to the compressor but may be concerned about pressure drop through the heat exchanger, so the engineer can size this tube larger than the ⅜-inchtube being used for channel A.

Example B: a larger size load can be combined with a smaller size cooling unit for a slower charging of storage medium for economizing the equipment cost. In this example a house requires a three-ton unit to adequately cool the house. It is expected that the three-ton air conditioner will need to run about 12 hours per day, which means that 36-ton hours of cooling are needed per day (3 tons×12 hours equals 36-ton hours). In this example there are no time-of-use rates for electricity meaning the homeowner is charged the same rate for electricity no matter what time of the day it is. To save money the homeowner could buy a small 1.5-ton air conditioner which can provide the cooling needs of 36-ton hours by running for 24 hours (24 hours×1.5 tons equals 36-ton hours). Because of the versatility of a multi-flow heat exchanger, a ¼-inch channel may be used for channel A (the source circuit) which will allow refrigerant oil to return to the compressor for a 1.5-ton compressor and a ½-inch tube for channel B (the load circuit) which will allow a low pressure to drop through the load heat exchanger. In addition, the larger size of channel B provides more surface area between the inner fluid and channel B, and even though channel B is not a part of channel A, the outer surface area of channel A will also be increased because it is conjoined and intimately thermally connected to the larger ½-inch tube, thereby increasing heat exchange between channel A and channel B and the thermal storage medium. In this example, the multi-flow heat exchanger would operate as follows. At night channel A is the cold source and only extracts heat from the storage medium. The storage medium is the load. In this example the system makes ice (charges) at night, so the heat flows from the storage medium to channel A, the cold source. Since the house requires 3 tons of cooling per hour but the system is equipped with only a 1.5-ton condenser, the condenser by itself cannot provide enough cooling during the day or anytime that cooling is needed. In these times, channel B acts as the load channel. Channel A, the source channel, continues to cool and extract heat from channel B because the two channels are thermally connected and the ice that was made by channel A at night can contribute to cooling channel B to make up for the deficit of cooling a 3-ton house with a 1.5-ton condenser. The storage medium becomes the cold source now from being the load at night. Therefore, the flow pattern at night entails heat being extracted by channel A from the storage medium, and the flow pattern during the day entails channel A and the storage medium cooling channel B which is acting as the load circuit. In this example, the B circuit acting as the load circuit is the dominant circuit. Even though the load circuit is dominant, and the source circuit is weaker, the system still functions efficiently, and the 1.5 ton condenser can provide enough cooling for a dominant load requiring 3 tons of cooling per hour. Because of system's stable equilibrium, the system functions efficiently and provides enough cooling.

Example C: a smaller size cooling load can be combined with larger size cooling unit for quicker charging of the storage medium to allow the compressor to be turned completely off during peak expense hours. In this example, the house needs the same 36-ton hours as in example B, but this house also has solar electric generation and is on time of use rates for electricity coming from the electric utility. The homeowner is charged 36 cents per kwh for electricity from 6:00 am to 9:00 μm, and the solar electric generates about 5 kwh from 10:00 am to 6:00 pm. This 5-kwh solar system can generate enough to run a 5-ton system when the sun is shining. Assume this house is located in an area that receives consistent sunlight from 10:00 am to 6:00 μm. When the homeowner generates more electricity than he needs, the utility only pays 4 cents per kwh when he sells the unused electricity back to the utility. Unfortunately, the solar system stops producing when the sun goes lower, so he has to sell his excess electricity to the utility for 4 cents during the day and then buy it from the utility at 36 cents from 6:00 pm to 9:00 pm when his solar system stops producing. It would be preferable to enable the solar system to produce the required electricity for the 36-ton hours of cooling rather than buying a portion of the electricity from the utility. To achieve this, the homeowner could use a 5-ton condenser in the thermal storage system even though he only needs 3 tons of cooling per hour. The system can be equipped with a timer that turns on at 10:00 am and runs to 6:00 pm. Running the 5-ton condenser for these 8 hours produces 40-ton hours of cooling, which covers the cooling needs of the house. This means that the homeowner does not need to buy electricity from the utility because the solar system will make enough ice (in this example) in the storage medium container to be able to turn off the compressor during the hours of 6:00 μm to 9:00 pm. During the sunshine hours of 10:00 am to 6:00 pm, when the solar system is generating, the 5-ton condenser extracts more heat through channel A (the source channel) than is needed per hour to cool channel B (the load Channel, which only needs 3 tons). Therefore, channel A extracts heat from channel B (the load channel) as well as from the storage medium to make ice. Channel A with a 5-ton condenser is now the dominant channel and can make ice and cool channel B which is a 3-ton load. At this point the storage medium is a load. After 6:00 pm the compressor is turned off and channel A is not utilized. Channel B is still the load circuit, but the storage medium shifts from being the load of channel A to become the source of cooling for channel B. The engineer can design the load circuit (in this example channel B) similarly to example B with a ½-inch channel, but the engineer may increase the size of channel A to ⅜-inch for the increased fluid flow that may be needed by a 5-ton condenser versus the 1.5-ton condenser in example B. In this example, channel A is dominant. The result is that, even though a 5-ton condenser is being utilized with a 3-ton load, the system operates efficiently because of the system's stable equilibrium. This is all done without expensive and sophisticated controls. The innate basic design tends towards Stable Equilibrium as a natural and inherent feature and advantage of this system.

Figure 3:
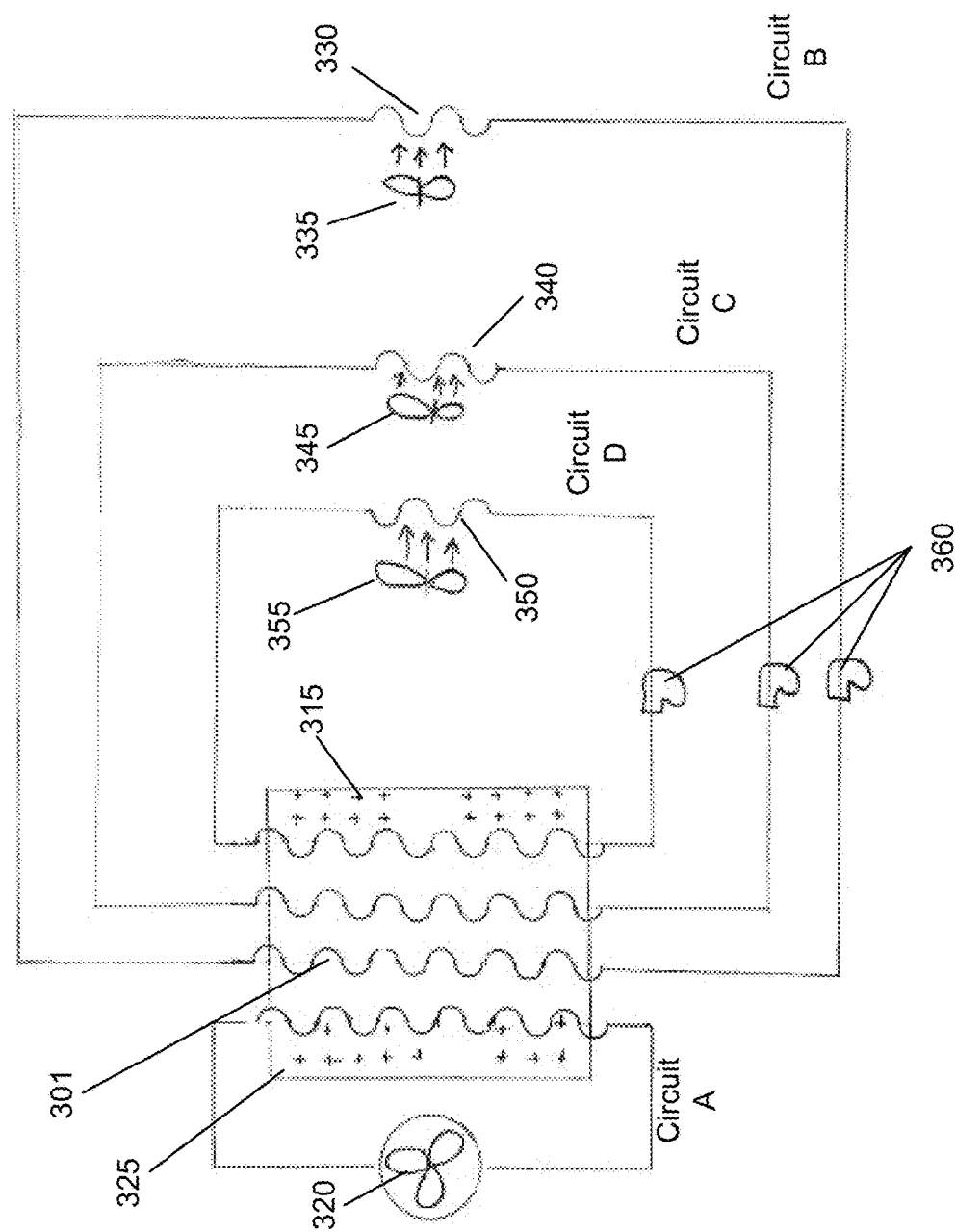
FIG. 3 is a diagram of a multi-flow heat exchanger in use an exemplary thermal storage application, in accordance with an embodiment of the present invention.
Figure 7:
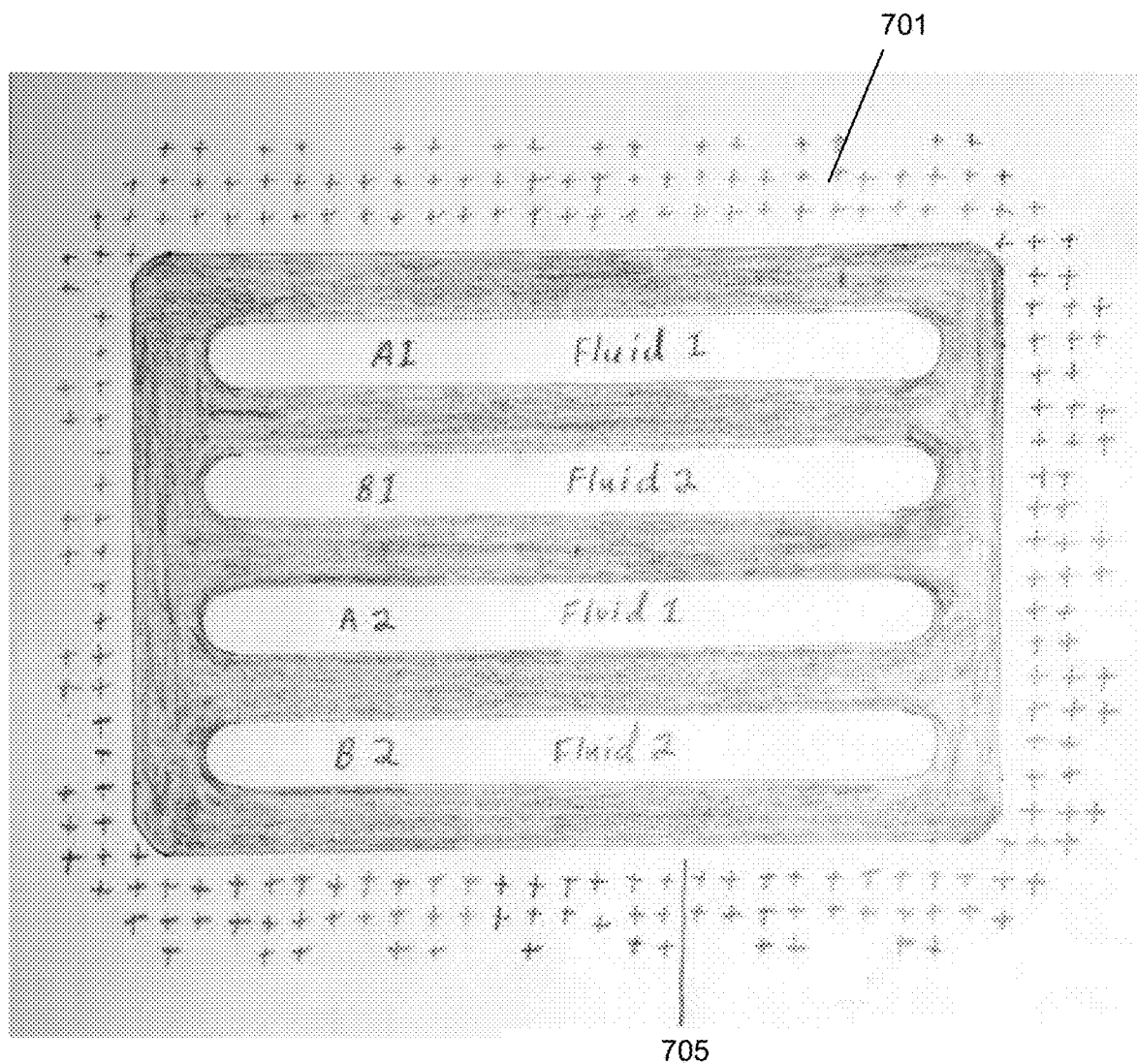
FIG. 7 is a cross sectional view of a four-channel multi-channel conduit, in accordance with an embodiment of the present invention.
Figure 11:
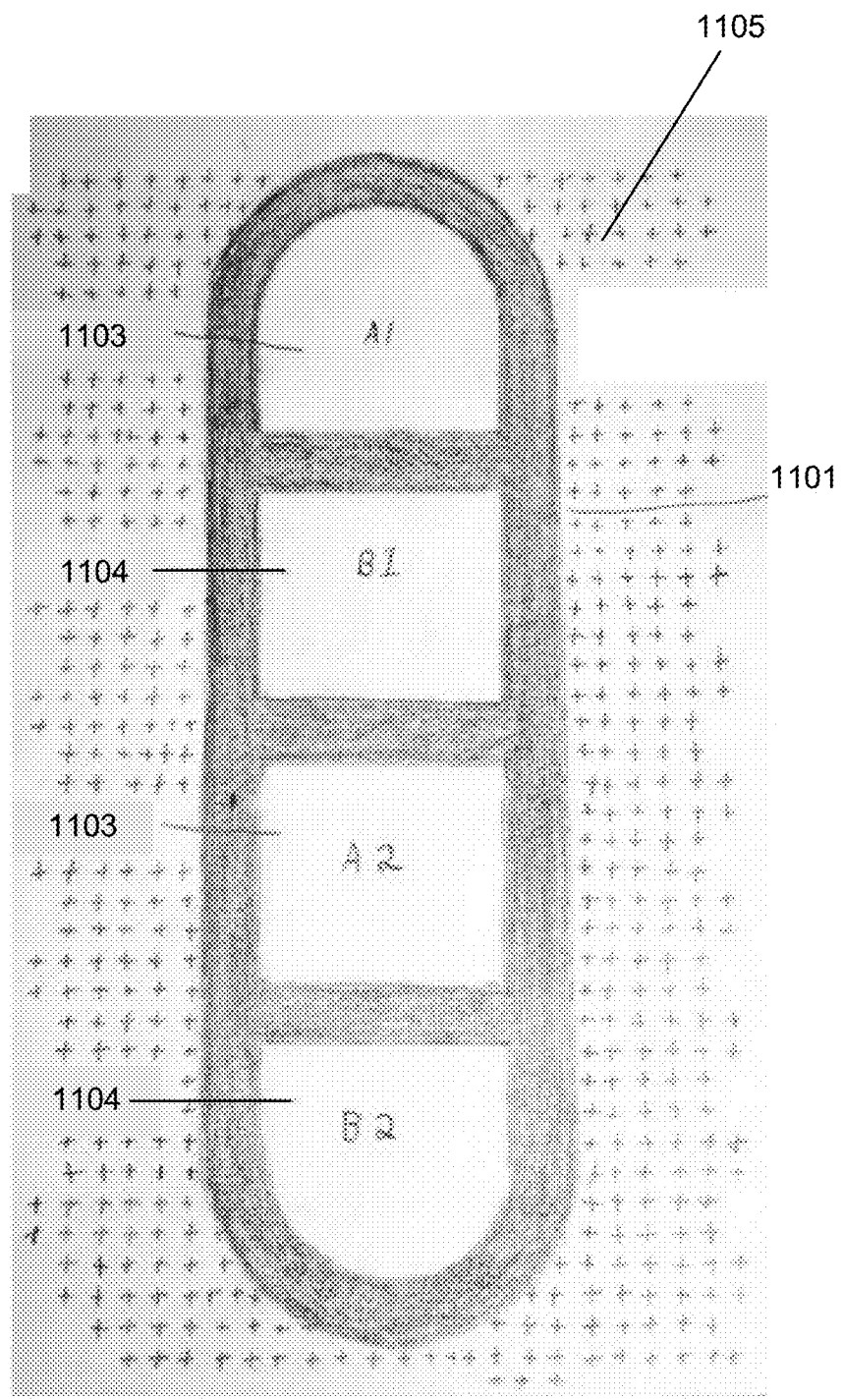
FIG. 11 is a cross sectional view of a four-channel, two fluid multi-channel conduit, in accordance with an embodiment of the present invention

FIG. 3 is a diagram of a multi-flow heat exchanger in use in an exemplary thermal storage application, in accordance with an embodiment of the present invention. In the present embodiment, the thermal storage application is similar to the example shown in FIG. 1 but with the addition of two more channels making it a four-channel system. The multi-flow heat exchanger comprises a multi-channel conduit 301 comprising four channels that are part of four separate circuits, Circuit A, Circuit B, Circuit C, and Circuit D. Multi-channel conduit 301 is situated within a storage medium 315. Examples of four-channel multi-channel conduits are shown in FIGS. 7 and 11. A condenser or heat pump 320 may be connected to Circuit A so that Circuit A may act as a refrigerant or heating circuit. A tank 325 contains storage medium 315. Circuit B comprises a heat exchanger 330. A fan 335 may be used to assist the heat exchanging in heat exchanger 330. Heat exchanger 330 may be utilized as load or source or as a combination load and source circuit. Circuit C comprises another heat exchanger 340 that may be utilized as a load or source or combination load and source circuit. A fan 345 may be used to move air through heat exchanger 340. Circuit D comprises a heat exchanger 350 and a fan 355 that may be used to assist in heat exchanging. Circuit D can also act as a load or source or combination load and source circuit like in circuits B and C. Pumps 360 may be included in each circuit to pump a fluid such as, but not limited to, a liquid or a refrigerant through the circuits.

Figure 4:
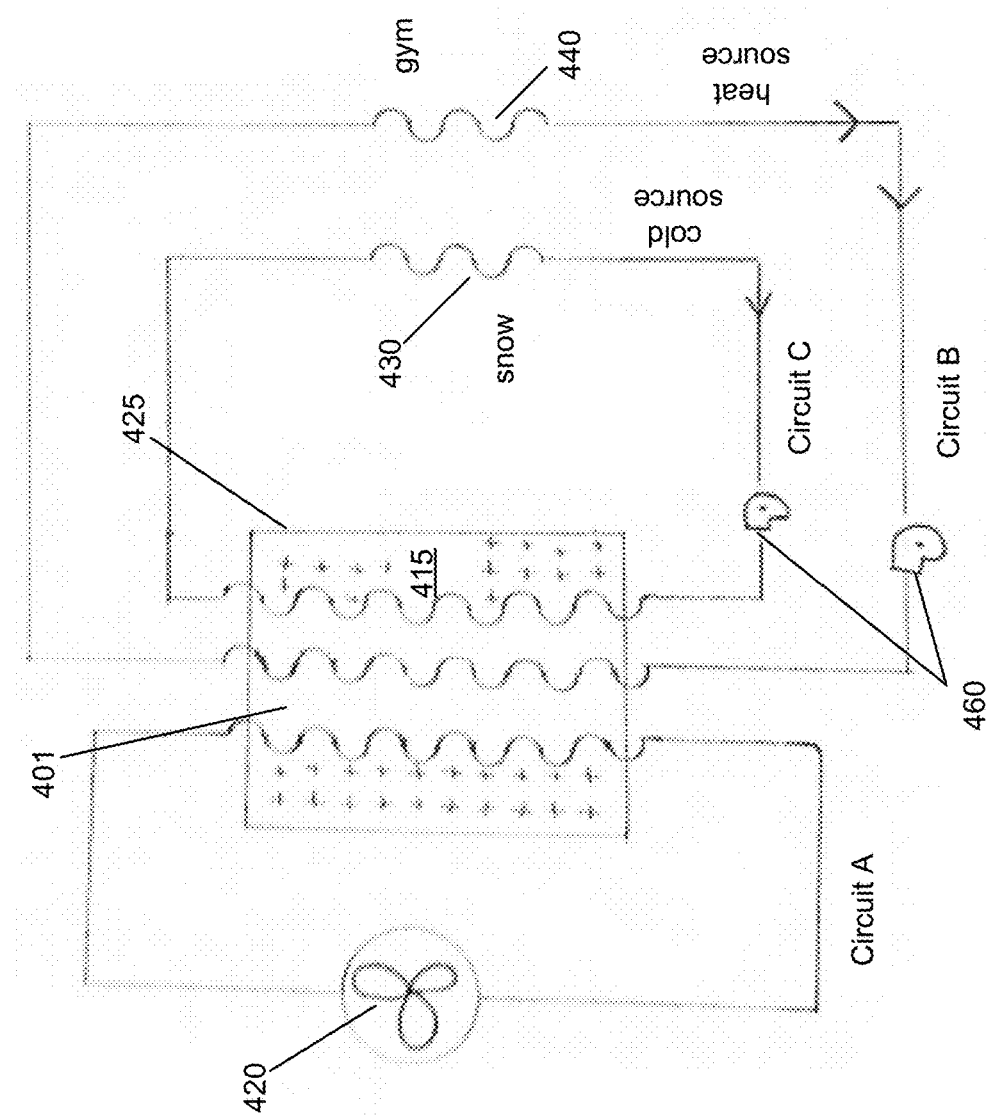
FIG. 4 illustrates an exemplary three-channel heat exchanger in use in an exemplary thermal storage application, in accordance with an embodiment of the present invention.
Figure 10:
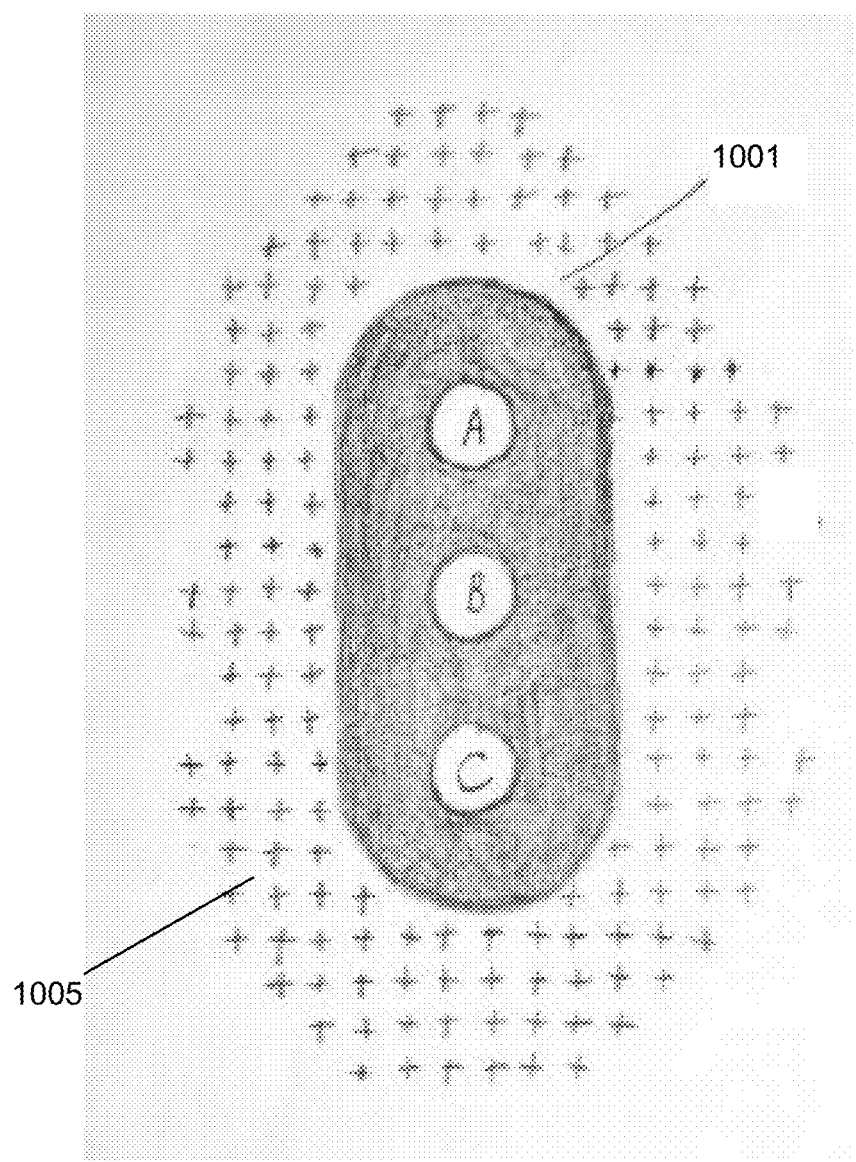
FIG. 10 is a cross sectional view of a multi-channel conduit, in according to an embodiment of the present invention.

FIG. 4 illustrates an exemplary three-channel heat exchanger in use in an exemplary thermal storage application, in accordance with an embodiment of the present invention. In the present embodiment, the three-channel heat exchanger is being used in a high school gym heat recovery system using a snow melt heat exchanger to cool the gym and melt the ice off the outside pavement simultaneously. A multi-channel conduit 401 comprises three channels that make up portions of three separate circuits, Circuit A, Circuit B, and Circuit C. Multi-channel conduit 401 is situated within a storage medium 415. An example of a three-channel multi-channel conduit is shown in FIG. 10. An outdoor section of a heat pump 420 which is used to remove/add heat may be connected to Circuit A. However, Circuit A is not being utilized in this scenario. A tank 425 or any other means able to properly hold storage medium 415 may be used to contain storage medium 415. Circuit C is being utilized as a combination load/source circuit that comprises a snowmelt heat exchanger 430. Circuit B comprises a radiant floor heat exchanger 440. In this scenario both Circuits B and C are combination load/source circuit since the gym is cooled and simultaneously the outside pavement is heated to melt the snow utilizing the heat being produced by the dancers inside the gym. The heat from the gym being collected by radiant floor heat exchanger 440 may be used to melt snow and ice on the pavement outside by snowmelt heat exchanger 430, or it could be said that the cold from the outside pavement is being used to cool the gym. Pumps 460 may be included in Circuit B and Circuit C to pump fluid through the circuits.

The following is an example of how a three-channel (or more) heat exchanger according to the present embodiment could be used. Example D: How multiple channels can be advantageous with a storage medium for heat recovery. Channel A is part of a refrigerant circuit comprising heat pump 420. The channel connected to Circuit A is usually but not always used as the source channel for heating and cooling the channels connected to Circuit B and Circuit C. The circuit connected to Circuit B usually functions as a load circuit to the Gym located in a climate where cold weather and snow is common, and the channel connected to Circuit C is typically part of a circuit that goes to snowmelt heat exchanger 430, which may be located under a paved area. It is winter and there is a dance being held in the gym where a thousand people are dancing, and even though it is ten degrees outside the gym gets hot and needs cooling. It is estimated that each dancer produces about 2000 btus. Most conventional cooling systems would turn on heat pump 420 in cooling mode and cool the gym. This system comprises a multi-flow heat exchanger and intelligent software and simultaneously turns on pumps 460 to both Circuit B to the gym and Circuit C to the outdoor paved area. The paved ground is cold, so Circuit C becomes the cooling source and Circuit B becomes the load. There is no need to turn on heat pump 420 circuit as long as Circuit C can provide enough cooling. If Circuit C cannot remove enough heat to properly cool the gym, heat pump 420 can be turned on as a back up to the cold source in Circuit C. Towards the end of the night, the software may anticipate the need for heat for the next morning and may shut off Circuit C to the snowmelt loop and start to store some of the heat being removed from the gym in storage medium 415. In this example the multi-flow heat exchanger is utilized as a heat recovery device when melting the snow and ice on the outside pavement, an economizer when cooling the gym, and then as a heat storage device to store heat until the next morning when the heat will be needed for warming the conditioned space.

Figure 5:
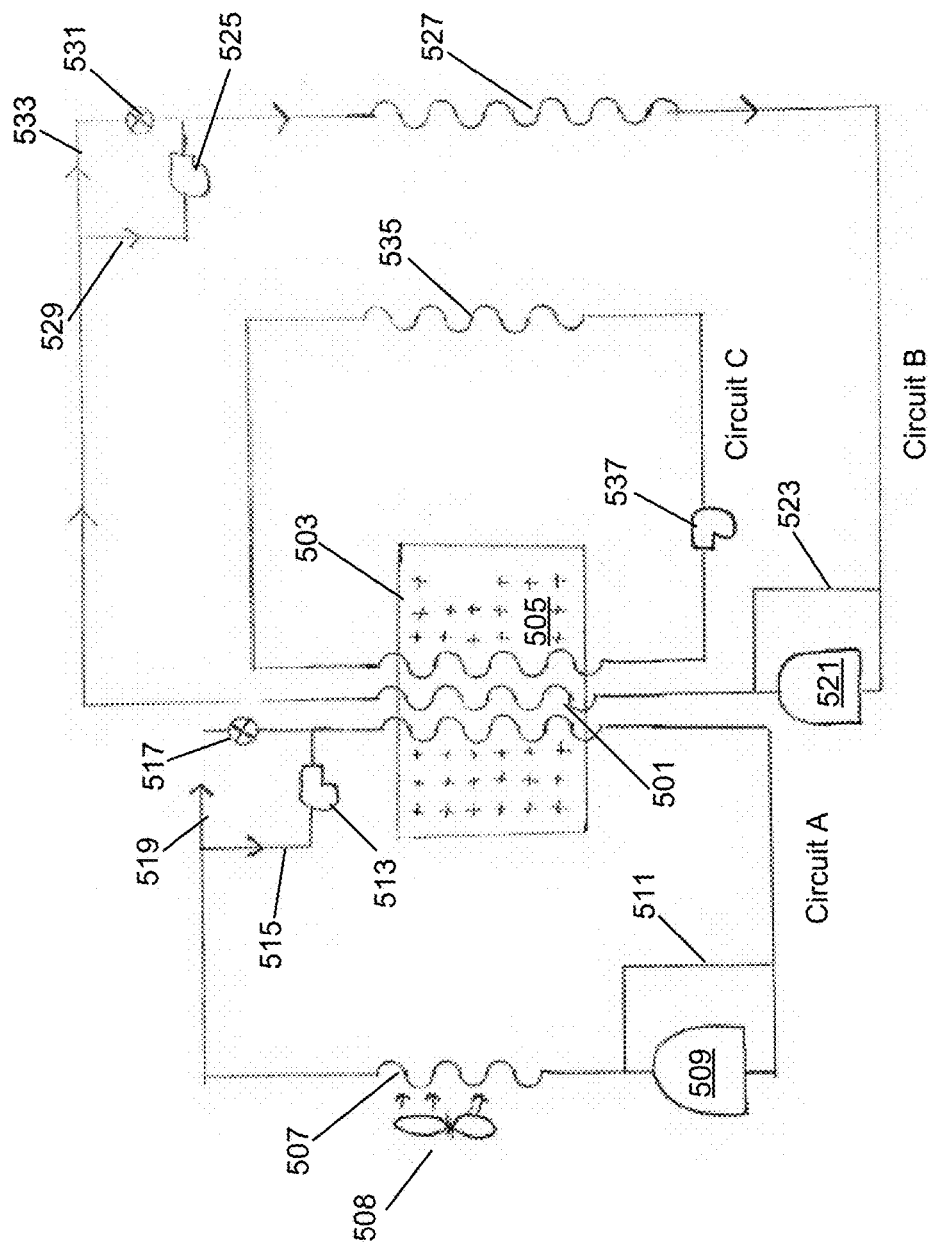
FIG. 5 illustrates an exemplary three-channel heat exchanger in use in an exemplary thermal storage application, in accordance with an embodiment of the present invention.

FIG. 5 illustrates an exemplary three-channel heat exchanger in use in an exemplary thermal storage application, in accordance with an embodiment of the present invention. In this embodiment of an application, liquid refrigerant pumps are utilized when an evaporator temperature/pressure in the evaporator is higher than the condensing temperature/pressure in the condenser. A multi-channel conduit 501 comprises three channels that connect to three circuits, Circuit A, Circuit B, and Circuit C. Multi-channel conduit 501 is situated in a storage tank 503 containing a storage medium 505. Channel A is a part of a cooling source only (no heat pump) circuit that circulates refrigerant between an outdoor heat exchanger 507 and multi-flow heat exchanger 501. A vapor compressor 509 in Circuit A may be utilized in warm ambient temperatures, and a compressor bypass loop 511 may be utilized in low ambient temperatures when compressor 507 is not in use but a liquid refrigerant pump 513 is in use. Outdoor heat exchanger 507 may be used to reject heat in both warm and cold ambient temperatures in this particular application. An outside fan 508 may be positioned by heat exchanger 507 to facilitate heat exchange between the ambient air and the fluid within heat exchanger 507. A meter bypass loop 515 may be used to bypass a metering device 517 when liquid refrigerant pump 513 is in use making the channel connected to Circuit A into a flooded evaporator. The flooded evaporator has at least some liquid throughout from beginning to end of the evaporator. Flooded evaporators are typically more efficient because liquid is more effective at removing/adding heat to/from the evaporator tube walls than vapor. Liquid refrigerant pump 513 is used when the outside ambient condensing temperature is lower than the inside evaporating temperature/pressure. When the ambient temperature is warmer and liquid refrigerant pump 513 is not in use a pump bypass loop 519 bypasses refrigerant pump 513. For example, in the winter scenario even though it may be 20° F. outside, the conditioned space may still need cooling because of all of the heat producing sources inside such as people, computers, lights, etc. The evaporator pressure/temperature may be at 45° F., but the condensing pressure/temperature may be at 30° F. Therefore, the evaporator pressure is higher than the condensing pressure/temperature in low ambient temperatures, and liquid refrigerant pump 513 can be used to pump liquid refrigerant to the higher pressure evaporator after it condenses and becomes liquid in the lower pressure condenser. Compared to high ambient temperature cooling in which vapor compressor 509 increases the pressure/temperature high enough to condense the refrigerant using the hot ambient outside air in which case the condensing pressure/temperature is higher than the evaporator pressure/temperature with the result that the condensed liquid refrigerant will flow towards the lower pressure metering device 517 and then the lower pressure evaporator heat exchanger. Referring to Circuit B, a compressor 521 may be utilized in winter when it is needed to move heat from the inner core of a building to the outer periphery of the building using Circuit B. A compressor bypass loop 523 may be used when a liquid refrigerant pump 525 in Circuit B is in use because if there are frozen portions of storage medium 505 in storage tank 503 the condensing temperature in storage tank 503 is at a lower temperature/pressure than the evaporating temperature/pressure in a heat exchanger 527 in Circuit B. Heat exchanger 527 may be used in the inner core of the building for heat removal. It is contemplated that heat exchanger 527 may be a fan coil, a radiant surface, a chilled beam, etc. Similarly, to Circuit A, Circuit B comprises a meter bypass loop 529 that bypasses a metering device 531 to route the circuit through pump 525. A pump bypass loop 533 bypasses pump 525 when compressor 521 is in use. Circuit C comprises a heat exchange 535 serving the periphery shell of the building. A pump 537 helps to circulate a fluid (liquid, vapor, multi-phase, etc.) to the periphery of the building. In warm temperatures pump 537 circulates a chilled fluid for cooling the periphery shell, and in cold temperatures pump 537 circulates a warmed fluid for heating the periphery shell. Because of the Multi-flow heat exchanger, Circuit C can exchange heat with storage medium 505, Circuit B or Circuit A or all of them simultaneously. In this embodiment, Circuit B, which is utilizing a refrigerant as the fluid, and Circuit C, which is utilizing water as the fluid are combined source/load circuits. Combined source/load circuits are advantageous because heat that is otherwise wasted can be recovered. Two desirable effects occur simultaneously: cooling and heating different loads by utilizing the load as a source of heat/cold for each other.

There are three different scenarios for a building based on Example E: a summer scenario for cooling only, a winter scenario for heating the periphery shell, and a spring/fall scenario for partial cooling load. These scenarios are configured for a large building in a climate that has very cold winters. Because of the size of the building and the internal heat produced from lights, people and computers, the building generally does not need heat to be added to the overall building. Basically, there is never a need to add heat to the interior of the building even in winter because the overall volume and internal heat creating sources create more heat than is lost at the periphery shell of the building. However, the building does need heat added to the periphery shell in winter because there is a lot of glass on the exterior walls also known as the periphery shell of the building.

The following is a summertime scenario. Channel A is used as a cooling source circuit only which circulates refrigerant between an outdoor condenser 507 and multi-flow heat exchanger 501. The pressure is lowered in channel A by metering device 517. Channel A serves as an evaporator. The purpose of Circuit A is to remove heat from storage medium 505 as well as from Circuit B and Circuit C and remove this heat from the building to the outside. Channel A freezes the water in storage medium 505 in summertime when all of the building including the perimeter of the building is in need of cooling. In this summer season there is no heating needed for any part of the building including both the inner core and outer perimeter shell. During summer, heat compressor 509 is used to increase the pressure within Circuit A for the purpose of condensing the refrigerant in condenser 507 at 10 degrees above the outdoor ambient temperature. Compressor 509 also must lower the pressure enough to boil (evaporate) the refrigerant at a low enough pressure to 20 degrees temperature/pressure. The temperature/pressure must be lower than the freezing point of water (32° F.) for the purpose of extracting heat from the water in storage medium 505 to freeze it during the summer, and the refrigerant boils at 20° F. Compressor 509 usage to create this large compression ratio (the difference between the low side evaporator pressure and the high side condensing pressure) is the main energy consumer in the system, but it cannot be avoided because the outdoor air is hot, sometimes near or above 90° F., and the air is what is used to cool the refrigerant to condense it. Therefore, compressor 509 must work hard to create pressure high enough to be able to condense the refrigerant into liquid. This is basically moving the heat (extracting heat) from the water in storage medium 505 and rejecting this heat to the outside. In summertime the condensing temperature/pressure is higher than the evaporator temperature/pressure, which is why compressor 509 is needed. Channel B is part of Circuit B. Channel B uses a refrigerant. Channel B is its own discrete (separate) channel. Channel B moves (extracts) heat from the interior core of the building. The interior of the building generally does not need heat added because there is typically no heat loss only heat gain from lights, people, computers, etc. Therefore, regardless of the season, the interior of the building typically needs cooling. During the summer, ice is maintained in storage tank 503. Channel B is used to condense the refrigerant at 40 degrees temperature/pressure in the storage tank utilizing the ice to condense the refrigerant in channel B during the summer only. Because of the ice's melting temperature at 32° F., the condensing temperature/pressure can be kept low at 40 degrees. The evaporator temperature/pressure may be kept at 50 degrees. The evaporator temperature/pressure is higher than the condenser. Therefore, liquid refrigerant pump 525 is used to pump the refrigerant as a liquid from where it is being condensed at 40 degrees to where it is boiling at 50 degrees temperature/pressure. This is an unusual situation where the evaporator pressure is higher than the condenser pressure. Compressors only pump vapor, and the vapor is already moving from the evaporator to the condenser because the pressure is higher in the evaporator than in the condenser. Thus, a compressor typically cannot effectively circulate the refrigerant. A liquid refrigerant pump is needed to pump the liquid refrigerant from the lower pressure condenser to the higher pressure evaporator. Using a liquid refrigerant pump in this way is typically very efficient compared to a compressor. For example, a vapor compression compressor may need about 800 watts per ton compared to a liquid refrigerant pump that may need about 30 watts to pump the same amount of refrigerant. That is because it is pumping liquid which is much denser than vapor. So, Circuit B is cooling the core of the building in this method. Circuit C is using a glycol/water mixture and is cooling the outer perimeter of the building in the summer. Because there is a lot of glass on the exterior shell, the building has heat gain from the exterior shell as well as heat gain from the interior core of the building. Channel C is circulated through multi-flow heat exchanger 501 which contains ice. The ice cools the glycol/water mixture which is circulated to the exterior perimeter of the building to cool it during summer. The building is kept cool by circuit A in summer utilizing compressor 509 to maintain the ice 505 in storage tank 503. The liquid refrigerant and glycol pumps consume very low energy to simply circulate refrigerant and water.

The following scenario is a spring and fall scenario where the perimeter shell needs some heat and there is a need to remove some heat from the building at partial load for the same building and system. During the spring and fall the same equipment can be utilized efficiently using the following method. Channel A, which is a part of circuit A, can still be used to remove heat from storage tank 503, but the water temperature in storage tank 503 may be allowed to be heated up to 100° F. by Circuit B rejecting its heat into storage tank 503. If more heat needs to be moved (extracted) to the outside for rejection by the condenser's heat exchanger 507, this may be done with refrigerant pump 513 because the condensing temperature/pressure is about 10 degrees above the ambient temperature, so the condensing temperature/pressure is condensing at 50 degrees. Pump 513, pumps liquid refrigerant to the evaporator which is Channel A of multi-flow heat exchanger 501. Because there is water that is approximately 100° F. in tank 503, the evaporator temperature/pressure is about 10 degrees below the water's temperature to allow the heat to flow from the water into the refrigerant to boil the refrigerant at 90 degrees temperature/pressure. Because the pressure is higher in the evaporator than in the condenser the liquid will be pumped from the condenser to the evaporator and the vapor leaving the evaporator will flow back to the condenser which, because of the low ambient temperature/pressure, the vapor condenses at 50 degrees temperature/pressure. Again, because liquid refrigerant is being pumped, which is much denser than vapor, the liquid pump consumes about ¹⁄₂₀ of the energy to move the same volume of refrigerant in a liquid state as compared to pumping vapor refrigerant by use of a compressor. The water temperature in the tank is heated to around 100° F. by Circuit B. Circuit B in low outside ambient temperature utilizes a vapor compression compressor 521 instead of the liquid pump that is used in the summer. Circuit B is cooling the interior core of the building. It is moving heat by evaporating refrigerant at 50 degrees temperature/pressure in the evaporator heat exchanger 527 and then condensing the refrigerant at 110 degrees temperature/pressure in Channel B of multi-flow heat exchanger. Channel B is being utilized as the condenser heat exchanger and is rejecting this heat into the storage medium 505 in tank 503 which is how storage medium 505 becomes heated. Storage tank 503 is now being used for sensible heat storage. Because the outside ambient temperature is typically lower than 50° F. in the spring and fall, the conditioned spaces near the perimeter shell of the building likely require some heating. There is heat loss there due to the glass windows. Circuit C is utilized to heat the perimeter shell of the building. The water is pumped through Channel C at 90° F. where it gains heat to become 100° F. and is pumped to heat exchanger 535 near the perimeter shell where it heats fan/coils in the heat exchanger and thus heats the conditioned spaces near the perimeter shell. The same equipment that was utilized for ice storage in summer is being used for heat recovery. The same compressor in Channel B is being used to produce to two products, a cooled inner core of the building and heated outer perimeter spaces near the shell of the building. This process is efficient because two products are obtained with the same compressor. The waste heat is recovered and sent to the perimeter where it is needed. Depending on various conditions, the overall building in spring and fall may have more heat gain than the perimeter shell spaces are losing which is basically net heat gain for the overall building. In which case Circuit A, utilizing liquid refrigerant pump 513, can remove the excess heat.

For a winter scenario when it is the coldest and the building needs all of its heat to be moved to the periphery shell, circuit A would not be used, and the internal heat gain from the core which is abstracted by circuit B and compressor 521 can be utilized to heat the periphery shell via the multi-flow heat exchanger 501 by channel A giving its heat to channel B. Channel B and its compressor 521 would maintain the temperature of the water in the tank at 110° F. resulting in the fluid in channel C being heated to 100° F. to be sent to its heat exchanger 535. However, if the heat gain from the interior core is not enough heat and the building is experiencing net heat loss, Circuit A can utilize a heat pump (not shown) that would take the place of the straight cooling condenser heat exchanger 503 and add heat to storage medium 505. In addition, if the sensible heat storage of storage medium 505 is not enough, a high temperature phase change material that has a phase change at 120° F., which is convenient for heating purposes, can be added to tank 503. This may enable the heat from the lights, people and computers that is extracted during the day to be stored until the next cold morning/day to be utilized to heat the perimeter shell spaces.

This system is economical because the same equipment is being used for cooling thermal storage, heating thermal storage, and heat recovery. In a variation of this example, only channels A and B could be used, with Channel A being used to extract heat from the overall building when the building moves into net heat gain and Channel B being used as the outside heat exchanger for a variable refrigerant flow heat pump that is capable of moving heat to/from various branches that have their own heat exchangers that could be fan/coils also known as "heads". The inner core of the building could have heads that remove heat and then reject the heat to the outer perimeter of the building. When there is an overall net heat gain over the entire building, the variable refrigerant flow heat pump can reject the heat via Channel B into the multi-flow heat exchanger. During winter, depending on anticipated heating or cooling needs, it could be advantageous to allow the thermal storage medium to heat up above freezing temperatures to around 130° F. and store some of the heat. For example, at the end of the work day the heat can be saved in the storage medium 505 from the prior day for the next day for a morning warm up of the building. During summer it is probable that maintaining ice in the storage tank would be the best strategy for taking optimum advantage of this storage system. During the spring and fall when cooling and heating needs vary, some embodiments may employ artificial intelligence to strategically maintain the most optimal temperature of the storage medium 505 depending various factors such as weather forecasts, the building's and each zone's history of heating and cooling, the number of people in the building, etc. Using this data artificial intelligence could take advantage of this multi-flow heat exchanger. For example, the artificial intelligence could determine what time of day would result in the best utility rates for the least expensive charging and discharging of the storage medium, how much ice (or any storage medium) should be made or melted, etc.

The following are examples of how the system illustrated by way of example in FIG. 5 functions in different capacities. These examples employ multi-media storage where two or more media for heat storage are utilized. The multiple storage media may be simultaneously combined into one mass that is not removed and replaced as the need changes. Alternately, two different masses that are removed and replaced as the need changes may be used for the multi-media storage. For example, with the one mass system, the medium would utilize two different substances that each have a phase change temperature that is advantageous for its purpose. One medium's purpose would be for comfort cooling. Water may be a good substance for this purpose because its phase change is at 32° F. The purpose of the other medium would be for comfort heating for which encapsulated paraffin wax may be a good choice. The paraffin wax or any PCM can be encapsulated in plastic (for example, without limitation, polyethylene) containers. In this example water is used within the storage tank in combination with encapsulated paraffin wax balls. The water freezes in summer for phase change, and the wax undergoes phase change (melts) in winter at 125° F. for heating mode storage. These two substances stay in the multi-media storage tank permanently and are not changed. This has the conveyance of not needing to be changed as the season changes. In a two-mass system, only water (or the cooling PCM) would be present in the storage tank for the cooling season. Then, for the heating season, the water would be drained, and paraffin wax is placed in the storage tank. This is less labor convenient than the single mass system, but it is typically more effective because there is more of the storage medium in the tank that is working for the particular purpose of that season. The paraffin wax or other such PCM can be encapsulated into many configurations including, without limitation, ball shapes with water surrounding them for thermal conductivity, brick shapes that can be slid into place in between the multi-channel conduit so that water is not needed for conductivity because the brick shape would be contacting the multi-channel conduit, custom shapes, etc. Encapsulated PCM with flat sides may be a good choice for heat exchangers with channels formed from or attached to sheet metal because the flat sides would typically create a large amount of thermal contact with the sheet metal. See FIGS. 14A and 14B for an example. A potential advantage of not using water for conductivity is that it would be less likely to freeze if the storage tank is unattended in a cold winter. Another option for the media in multi-media storage is a mix of water and glycol, or salt or any PCM to lower the freezing temperature for systems being used in colder temperatures such as, but not limited to, subzero food storage. In various embodiments, the multi-channel conduit can be adaptable in configuration to accept encapsulated phase change materials that fit together like a glove for thermal conductivity to the encapsulated phase change material. In some embodiments, non-encapsulated PCM can be utilized that is in direct contact with the multi-flow heat exchanger.

Some example embodiments of multi-channel conduits comprise two or more tubes welded along the length or one singular mass of heat-conductive material such as a metal that is extruded that has two or more channels running parallel to one another (see FIGS. 2, 6, 7, 8, 9, 10, 11). Other exemplary embodiments may comprise three pieces of sheet metal welded that are combined with one another in which two of the outer pieces have channels that can be formed with a die (see FIGS. 12A and 12B). These embodiments are for illustration only and do not represent the innumerable possible embodiments of different shapes and configurations to achieve this concept of a multi-channel conduit. For example, in one alternate embodiment a multi-channel conduit can be made in large concrete blocks with two or more channels one serving for the source circuit and one for the load circuit. The concrete can be immersed in a storage medium such as water or the concrete itself can be used as the sensible thermal storage medium. The load channel may be a liquid fluid or a vapor fluid such as air and the source circuit could be any fluid including chilled water. This way the concrete can serve as the walls or the floor of a building structure, and the multi-channel conduit can incorporate the mass in the walls themselves as a storage medium and also serve as the structure of a building itself. Also, large chilled/heated walls/floors can radiate into the conditioned space because they have so much mass that even after the source circuit stops cooling/heating the concrete mass continues to expel or absorb heat from the building. In other alternate embodiments, the channels may have agitators on the inner surface of the channel and/or the outer surface of the channel to cause fluid movement/agitation to enhance heat exchanging.

Figure 6:
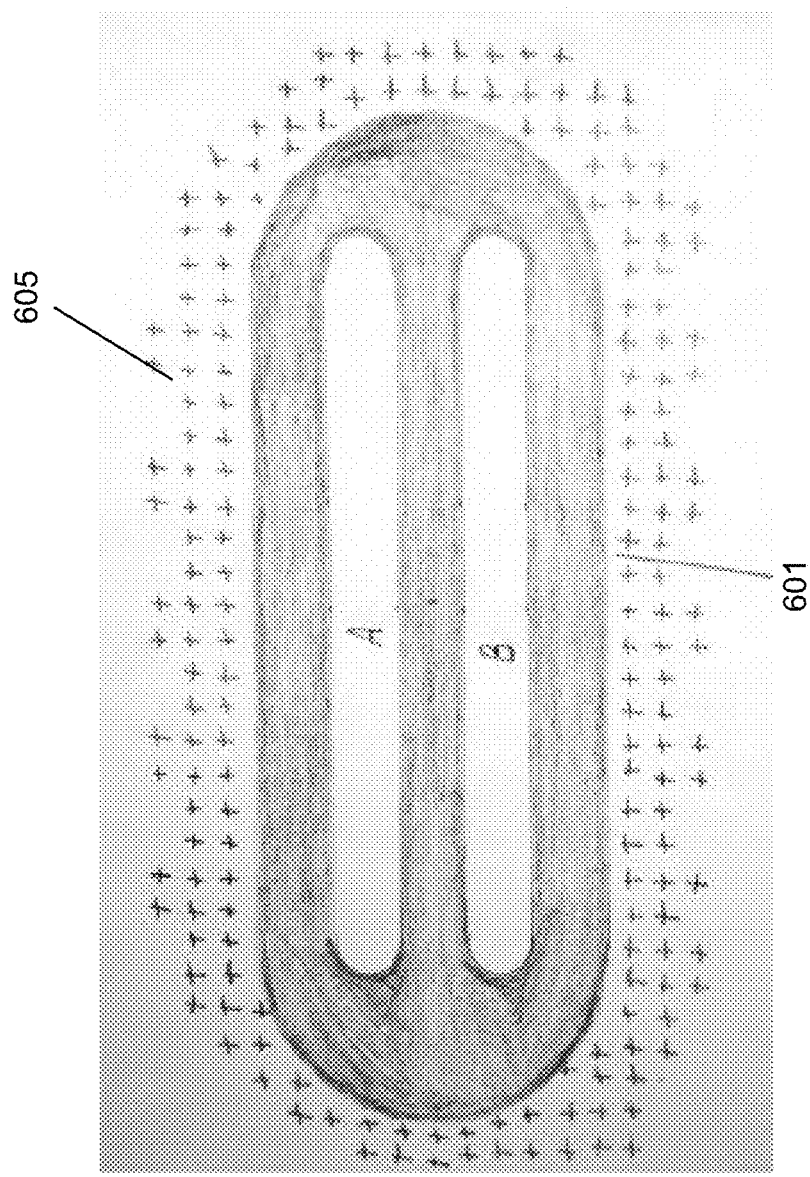
FIG. 6 is a cross sectional view of a two-channel multi-channel conduit, in accordance with an embodiment of the present invention.

FIG. 6 is a cross sectional view of a two-channel multi-channel conduit, in accordance with an embodiment of the present invention. In the preset embodiment, the configuration of multi-channel conduit 601 has the advantage of enhanced surface area between the two channels, channel A and channel B, and between a storage medium 605.

FIG. 7 is a cross sectional view of a four-channel multi-channel conduit 701, in accordance with an embodiment of the present invention. In the present embodiment, channel A1 and channel A2 are two branches of one trunk channel that contain the same fluid (fluid 1). Fluid 1 is a part of only one circuit, circuit A (not shown). Similarly, channel B1 and channel B2 are two branches of one trunk channel and contain the same fluid (fluid 2), which is a part of circuit B (not shown). In this four-channel, two-fluid system, multi-channel conduit 701 has the advantage of even greater heat exchange between the channels because the same fluid is in channel A1 and channel A2 and the same fluid is in channel B1 and channel B2, which provides enhanced surface area between the two fluids and therefore enhanced heat exchange between the two fluids. Multi-channel heat exchanger 701 is situated in a storage medium 705.

Figure 8:
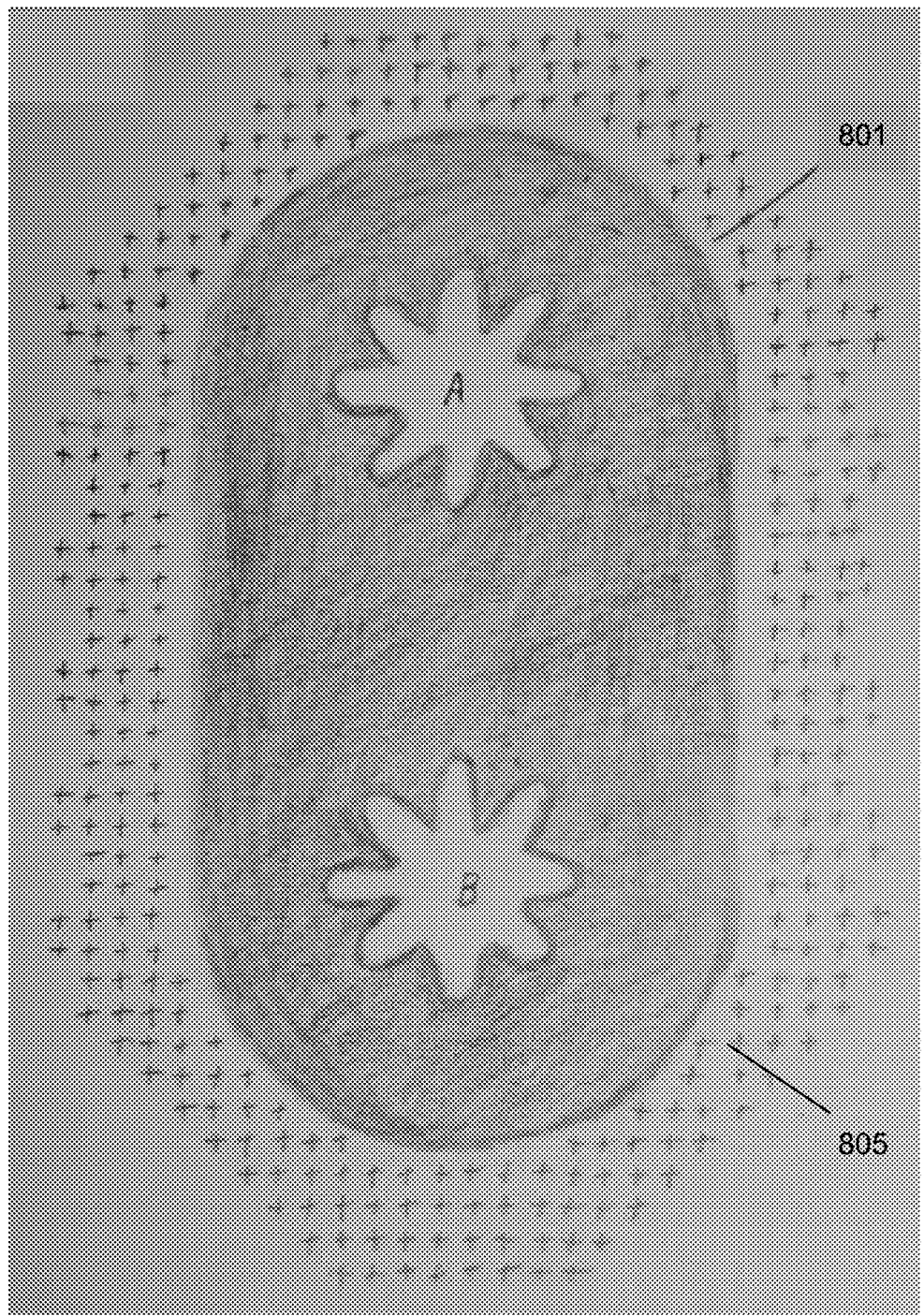
FIG. 8 is a cross sectional view of a two-channel multi-channel conduit, in accordance with an embodiment of the present invention.

FIG. 8 is a cross sectional view of a two-channel multi-channel conduit 801, in accordance with an embodiment of the present invention. In the present embodiment, a channel A and a channel B are components of their respective circuits (not shown). Channel A and channel B are shaped in starburst configurations. This gives multi-channel conduit 801 the advantage of enhanced surface area between the fluid within the channels and the conductive material of multi-channel conduit 801. Multi-channel heat exchanger 801 is situated in a storage medium 805. There are numerous ways to enhance the heat exchange between the inner fluid and the channel wall including, but not limited to, rifling the inner tube, abrupt changes in the tube's direction, inner fins, wavy patterns on the inner tube, etc.

Figure 9:
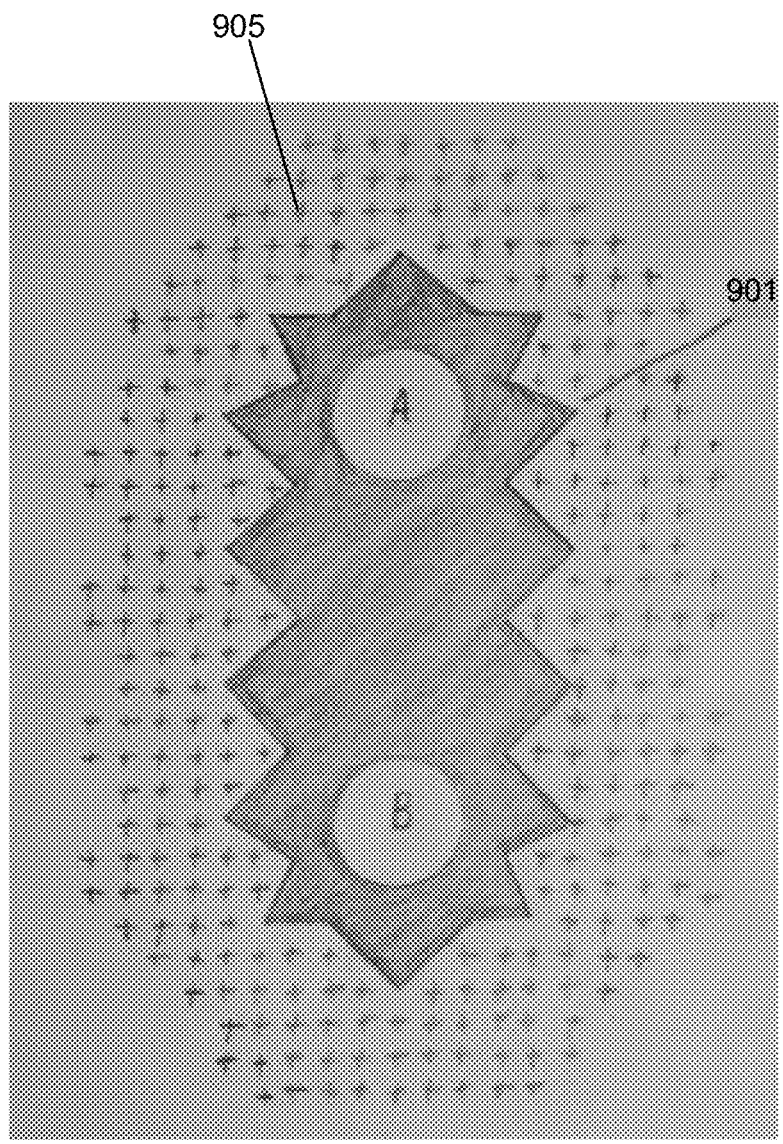
FIG. 9 is a cross sectional view of a multi-channel conduit, in accordance with an embodiment of the present invention.

FIG. 9 is a cross sectional view of a multi-channel conduit 901, in accordance with an embodiment of the present invention. In the present embodiment, multi-channel conduit 901 has the advantage of enhanced surface area between the outer conduit walls and a thermal storage medium 905 because of the external shape of the outer walls. A channel A and a channel B are components of their respective circuits (not shown). There are numerous configurations that can enhance the heat exchange between fluids themselves and fluids and the storage medium. The foregoing are some examples of how the heat exchange can be enhanced. Other means for enhancing heat exchange may include without limitation, a grooved outer surface on the conduit, additional branch channels of one trunk channel containing the same fluid, adding plate fins, adding spine fins that reach out into the storage medium, fins can be added to the tube, etc. In addition, the tube can be extruded with fins as a part of the same material as the tube; groves can be made in the tube walls; sheet metal can be attached by solder (see FIGS. 13A and 13B; sheet metal can be bolted to the tubes (see FIG. 15), etc.

FIG. 10 is a cross sectional view of a multi-channel conduit 1001, in according to an embodiment of the present invention. In the present embodiment, multi-channel conduit comprises three discrete channels for use with multiple zones. Examples D and E above illustrate the use of more than 2 channels and how these circuits may be utilized. A channel A is a component of circuit A (not shown); a channel B is a component of circuit B (not shown), and a channel C is a component of circuit C (not shown). Each of the circuits contain three separate and totally discrete fluids for their respective source or load heat exchangers. Multi-channel heat exchanger 1001 is situated in a storage medium 1005.

FIG. 11 is a cross sectional view of a four-channel, two fluid multi-channel conduit 1101, in accordance with an embodiment of the present invention. In the present embodiment, multi-channel conduit 1101 is only using two fluids, a first fluid 1103 and a second fluid 1104, with four channels channel A1, channel A2, channel B1, and channel B2. Channel A1 and channel A2 contain fluid 1103, and channel B1 and channel B2 contain fluid 1104. It is believed that the configuration of the fluids within the channels may allow for enhanced heat exchange between the fluids themselves and enhanced heat exchange between the fluids and a storage medium 1105 when only one fluid is in operation. By alternating the fluids, the heat may more evenly conduit throughout the width of multi-channel conduit 1101 when one fluid is in operation. Channel A1 and channel A2 are two branches of a trunk channel which is a component of circuit A (not shown), and channel B1 and channel B2 are branch channels which are a part of a trunk channel which is a component of circuit B (not shown).

Figure 12A:
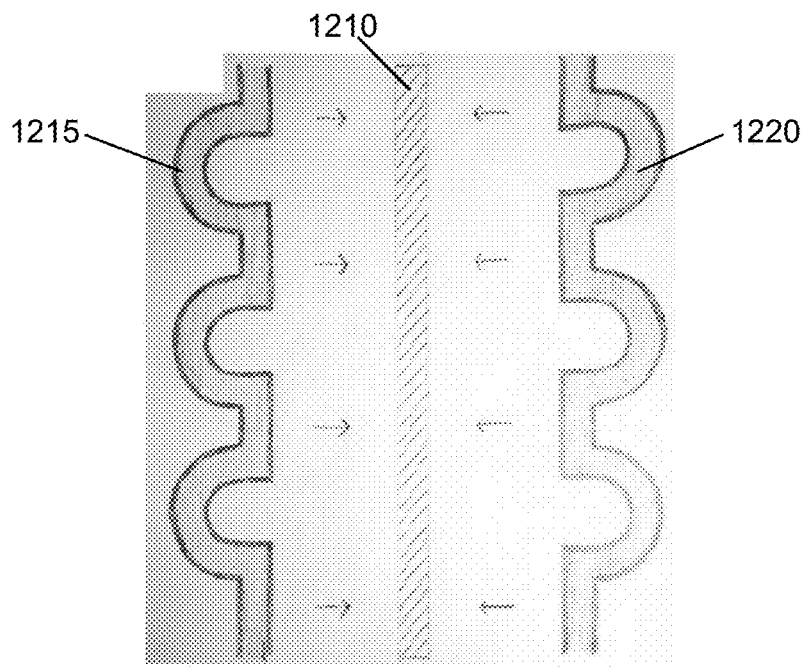
FIGS. 12A and 12B are cross sectional views of a multi-channel conduit formed from three plates, in accordance with an embodiment of the present invention.
Figure 12B:
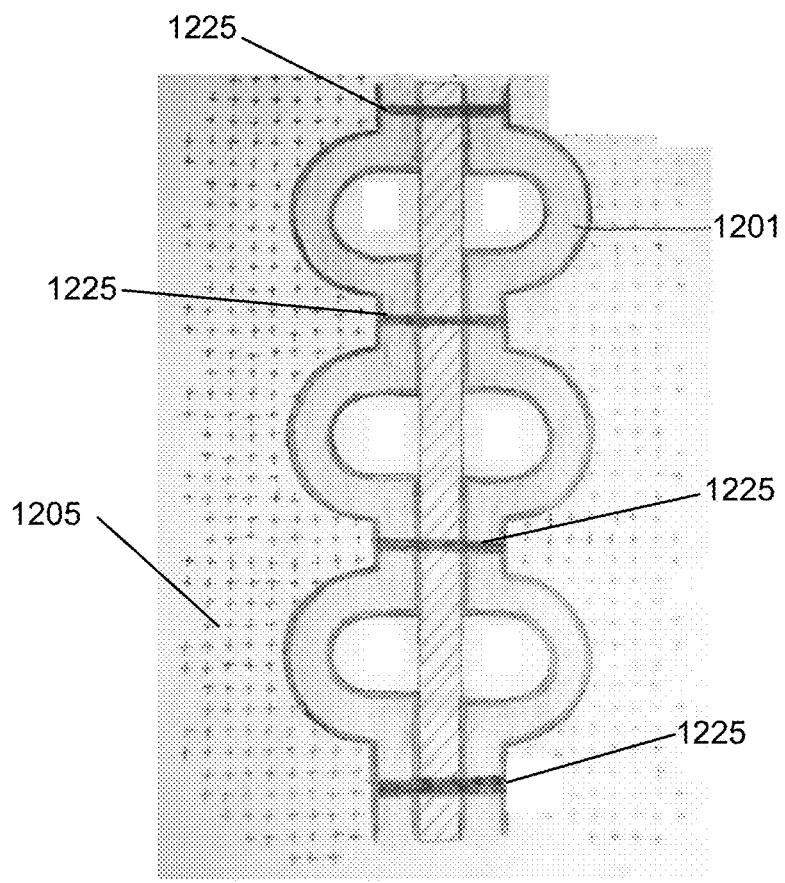

FIGS. 12A and 12B are cross sectional views of a multi-channel conduit 1201 formed from three plates, in accordance with an embodiment of the present invention. FIG. 12A shows the three plates in the process of being combined to form multi-channel conduit 1201, and FIG. 12B shows multi-channel conduit 1201 fully assembled and situated in a storage medium 1205. In the present embodiment, multi-channel conduit 1201 comprises three plates that are formed and joined together. A center plate 1210 is kept straight, and two outer pieces 1215 and 1220 are formed with a die and then combined to form discrete and separate channels. Plates 1210, 1215, and 1220 may be made of heat conductive materials such as, but not limited to, sheet metal of copper, aluminum, titanium, etc. Referring to FIG. 12B, plates 1210, 1215, and 1220 are shown being fastened together with fasteners 1225 such as, but not limited to, bolts and gasket material. In alternate embodiments the plates may be joined using various different means, for example, without limitation, welding, or adhesive. A potential advantage of forming multi-channel conduit 1201 in this way is that plates 1210, 1215, and 1220 may also act as a fin that expands the surface area of multi-channel conduit 1201 and may enhance the heat exchange between fluid(s) within the channels and storage medium 1205.

Figure 13A:
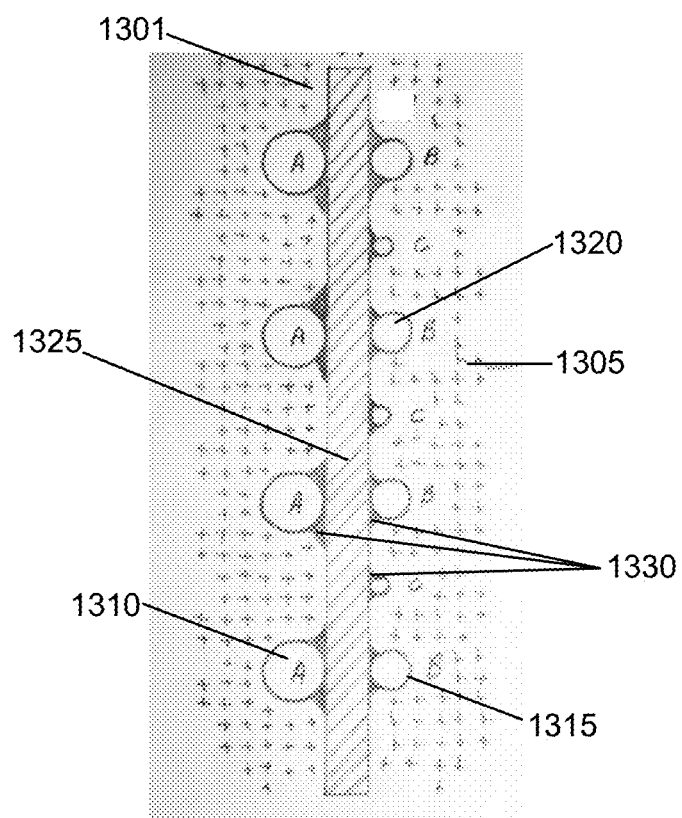
FIGS. 13A and 13B illustrate an exemplary tube-on-plate, multi-channel heat exchanger, in accordance with an embodiment of the present invention.
Figure 13B:
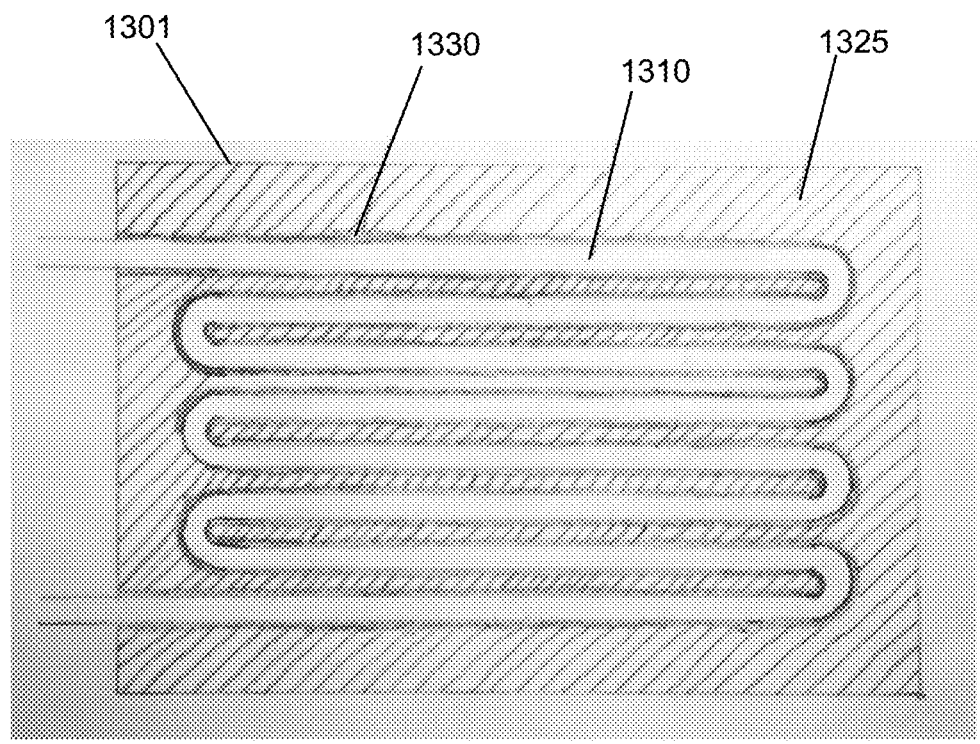

FIGS. 13A and 13B illustrate an exemplary tube-on-plate, multi-channel heat exchanger 1301, in accordance with an embodiment of the present invention. FIG. 13A is a cross sectional view of multi-channel heat exchanger 1301 situated in a storage medium 1305, and FIG. 13B is a side view of multi-channel heat exchanger 1301. In the present embodiment, multi-channel heat exchanger 1301 may be formed by soldering common fluid tubes 1310, 1315, and 1320 onto a singular plate 1325 of heat conducting material such as, but not limited to, sheet metal. Plate 1325 may act as a fin for enhanced surface area between tubes 1310, 1315, and 1320 and storage medium 1305. Plate 1325 may also conduct heat between the fluids in tubes 1310, 1315, and 1320 so that the fluids can exchange heat with each other and with storage medium 1305. Tubes 1310, 1315, and 1320 may be formed by a singular extruded material without seams and are less prone to fluid leakage than welded or fastened designs while still providing enhanced surface area that is similar to the Tri-Plate design shown by way of example in FIGS. 12A and 12B. Also note that tubes 1310, 1315, and 1320 are shown having different sizes. The tubes in alternate embodiments may have the same size or have multiple sizes to fit the need of each circuit. Referring to FIG. 13B, tube 1310 is joined to plate 1325 in a serpentine configuration but many configurations could be utilized including, without limitations branching channels that branch into smaller sub-channels (branches) and then re-converge into a main trunk channel for enhanced heat exchange between the fluid and the plate or two discrete channels in parallel in a serpentine configuration. Solder joints 1330 join tubes 1310, 1315, and 1320 to plate 1325.

Figure 14A:
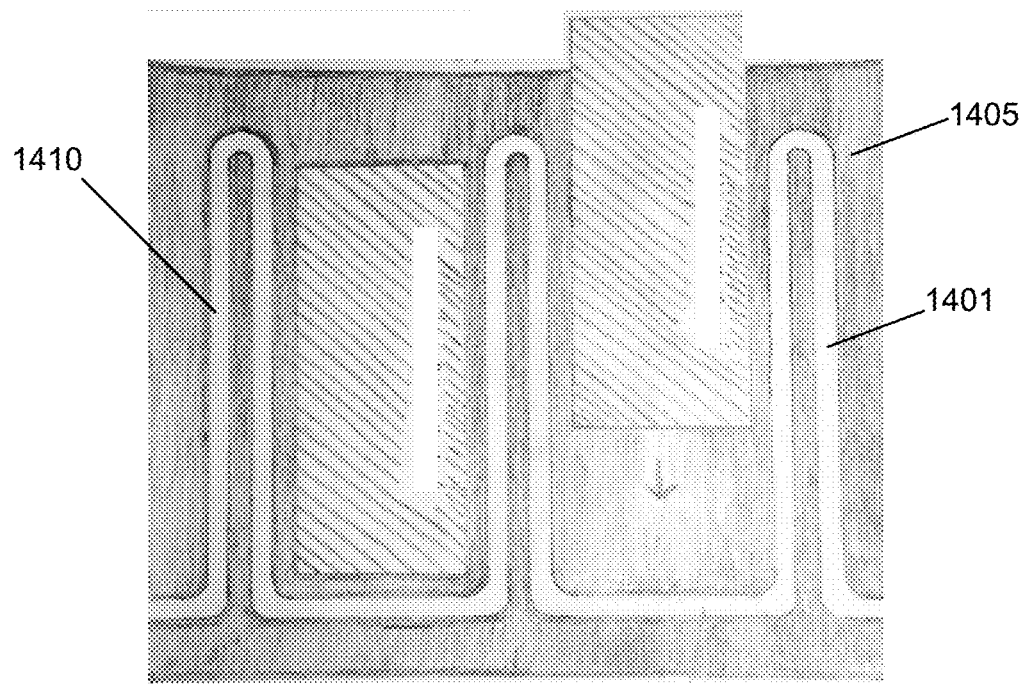
FIGS. 14A and 14B illustrate an exemplary multi-channel conduit adapted for insertion of encapsulated phase change material (PCM), in accordance with an embodiment of the present invention.
Figure 14B:
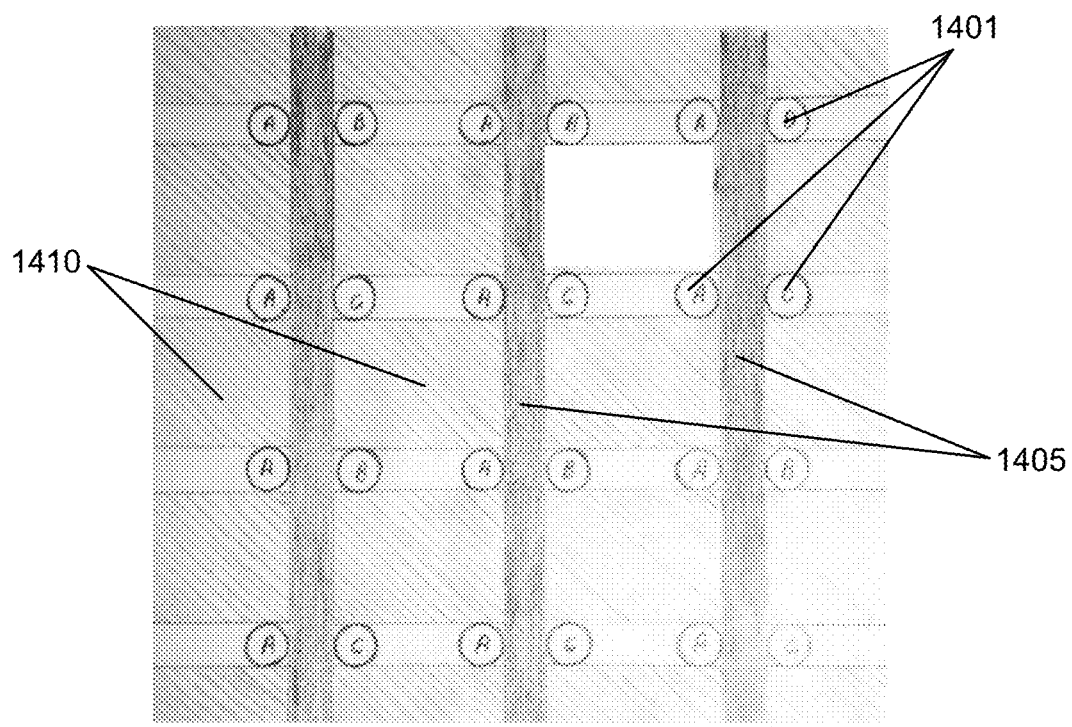

FIGS. 14A and 14B illustrate an exemplary multi-channel conduit adapted for insertion of encapsulated phase change material, in accordance with an embodiment of the present invention. FIG. 14A is a side view, and FIG. 14B is a front view of an open ends of three multi-channel conduits arranged in a configure appropriate for this application. In the present embodiment, a channel 1401 of the multi-channel conduit may be formed and soldered to a conductive plate 1405, which may be made of sheet metal or another conductive material in a configuration that allows for removable encapsulated bricks of PCM 1410 to fit between bends in channel 1401. This configuration can work with various different types of multi-channel conduits including, without limitation, the multi-channel conduits shown by way of example in FIGS. 12A-12B. Referring to FIG. 14B, showing a view of the heat exchanger from an open end. PCM capsules 1410 can be inserted and removed from this end as is needed to change the storage medium for seasons or to suit other changing conditions. PCM capsules 1410 are sandwiched in between plates 1405 and have intimate thermal contact with plates 1405 to facilitate heat exchange between plates 1405 and PCM capsules 1410. This allows the heat exchange to occur without needing water or another medium in the tank to conduct heat between plates 1405 and PCM capsules 1410. The advantage of this is that there is no danger of water left in the tank in sub-freezing temperatures freezing and damaging the tank or the heat exchanger. The present embodiment comprises three channels, channel A, channel B, and channel C. The present embodiment may be useful as a multi-seasonal heat exchanger though it is not limited in application to seasonal temperature change. For example, a PCM with a melting/solidification point of 120° F. can be inserted for thermal storage for comfort heating during the winter, and a different encapsulated PCM with a melting/solidification point advantageous for cooling, for example 40° F., can be installed for comfort cooling during the summer. As another option for the summer would be to use no encapsulated PCM and instead fill the tank with water as the phase change material or as a sensible storage medium.

FIG. 14B illustrates how example F, two season storage, can be achieved, and also example I below. Note that there are three channels (channel A, channel B and channel C) in this figure. The hybrid solar panel in example I generates energy in two forms, both electric energy and hot water. Channel A can be used as a source circuit for the heat pump. Channel B can be used as a load circuit to heat/cool the load, and channel C can be used as a hot fluid channel as a component for circuit C, which gets its heat from the hydronic component of the hybrid solar panels.

Example F is an example of thermal storage for cold and thermal storage for heat all in the same storage container, see FIGS. 14A and 14B. This example is based on a typical home in the Midwest that needs heat in the winter and cooling in the summer. The house has a heat pump. During the summer the storage tank of the thermal storage system can be filled with water. Water has a freezing temperature of 32° F. and the latent heat can be used for comfort cooling storage. This same storage tank can be used in the winter for comfort heat storage. The water itself can be used as hot water storage or encapsulated phase change materials can be added to the water that have a temperature of latent heat phase change that is advantageous for heating, for example 120° F. The water can be used as a medium to conduct heat to and from the encapsulated phase change material from the multi-flow heat exchanger. Also, the encapsulated phase change materials can be made into flat rectangular bricks that can be inserted in between the tubing passes of the multi-flow heat exchanger so that they have good thermal contact directly with the heat exchanger itself regardless of whether there is water in the storage tank making water unnecessary. It is advantageous to remove the water because if the water in the tank freezes from the outside it could damage or destroy the tank. Water that freezes from the inside as it does in thermal storage has less chance of destroying the tank as the ice expands because the expanding water just gets pushed up and there are typically safety switches that turn off the compressor before the water gets completely frozen. Water that freezes from the outside can freeze the top layer first like a lake and thereby sealing in the interior water that then gets frozen and expands but has no place to expand to, so it pushes the sides of the tank out when it expands. Also, for winter, non-encapsulated phase change material can be added to the tank after the water is drained. This can be used with photovoltaic panels that can power a compressor during the sunshine hours in winter to store thermal heat for the night and during the day to store thermal cold during the summer.

Figure 15:
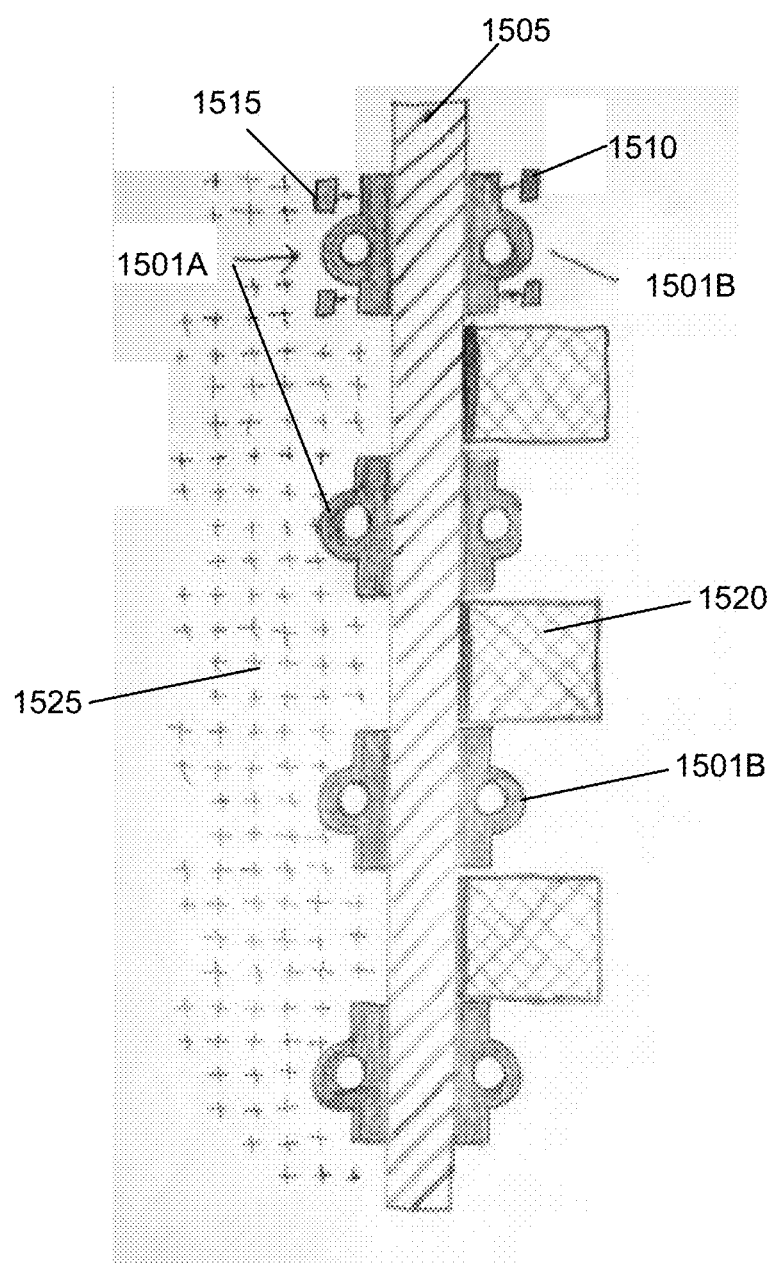
FIG. 15 is a cross sectional view of an exemplary tube-on-plate, multi-flow heat exchanger, in accordance with an embodiment of the present invention.

FIG. 15 is a cross sectional view of an exemplary tube-on-plate, multi-flow heat exchanger, in accordance with an embodiment of the present invention. In the present embodiment, channels 1501A and 1501B may be joined to a plate 1505, which could be made of practically any heat conducting material such as, but not limited to sheet metal or graphite. Channels 1501A and 1501B may be manufactured by extrusion with a flange that may be bolted to plate 1505 on each side or, as shown in the figure, a bolt 1510 may extend through plate 1505 and through another channel on the opposite side so that when bolt 1510 is tightened to a nut 1515 the two channels clamp plate 1505 between them. A potential advantage of this method is that any material can be used like graphite because it does not need to be a material that compatible for welding. Another potential advantage is that the tubes forming channels 1501A and 1501B are one continuous, extruded material, which is not prone to leakage. Channels 1501A on one side may correspond to an A circuit, and on opposite side is channel B labelled B. In the present embodiment, the storage medium surrounding multi-flow heat exchanger may be encapsulated PCM bricks 1520 or non-encapsulated phase change material 1225, for example water, salt water, paraffin wax, etc. The present embodiment may be used with sensible heat storage as well.

Example G illustrates how a thermal storage system can be used to run at an ultra-low percentage of full capacity. In this example, a 5000 square foot house has a west facing room with a large glass window. This room gets hot in the evening when the sun gets lower even though the rest of the house is comfortable. So, the problem is that just this one room is hot. The house at full load needs a full 5-ton air conditioner, but only 6,000 btus are needed to cool this west room of the house which is only 10% of the full capacity of the 5-ton heat pump. Even expensive variable speed drives cannot operate at this low partial percentage of their full capacity. The lowest capacity at which such drives can operate is usually around 35% of full capacity. When utilizing a conventional air conditioner unit or even a variable refrigerant flow, the compressor must have adequate airflow through the evaporator to ensure that all of the refrigerant has been evaporated before it returns to the compressor. Damage to the compressor can occur if there is not adequate airflow to heat up the refrigerant and cause all of its liquid to evaporate and change into vapor before it returns to the compressor. It is also a big waste of energy to be using an energy intensive compressor and not give the proper airflow through the evaporator. The compressor is still using a lot of energy but because it cannot evaporate all of the refrigerant it just uses a lot of energy without an equal and proper proportional cooling that should be provided for the energy being expended. Instead, the load channel circuit may use a small pump to circulate the fluid through a multi-flow heat exchanger and then through another heat exchanger such as an indoor coil in an air stream like on a conventional heat pump air handler to distribute the heat/cold, or it can distribute the heat/cold through a radiant barrier heat exchanger. The compressor may or may not be in operation when this small circulating pump is distributing the heat/cold. The storage medium acts as a buffer between the now oversized 5-ton compressor and the load which only needs 6,000 btus.

Example H illustrates a solution to HVAC zoning defects. In California almost all new construction comprises zoning for two story homes. This is because of stratification which is basically that the air tends to form in strata (layers) with the hot air moving to the upstairs stratum (layer) and the cooler air moving to the downstairs stratum (layer), which may result in a ten-degree difference in temperatures from upstairs compared to downstairs. The solution is zoning which utilizes two supply branches, one supplying air to the upstairs and one supplying air to the downstairs. Each branch has a damper to control its branch. The defective situation is that when one of the branches is closed there is not sufficient air flow through the ducts due to half the duct system being closed. The ducts were designed to supply enough air with both dampers open, but the actual and practical present situation is that, because of stratification, 95% of the time only one damper is open. The upstairs damper is typically open for cooling and the downstairs damper is typically open for heating. Because heat rises (also called the stack effect like the stack on an ocean-going ship, the smoke goes up because it is warmer than the surrounding air) the heat goes up, and the upstairs gets the heat. This may then cause the upstairs thermostat to call for cooling. When cool air is put into the upstairs space it cools the upstairs and then this cool air drops to the downstairs level of the house. Even though the cool air is supplied to only the upstairs the downstairs space may still get cooler than the upstairs. The same is true for the heating season. The downstairs thermostat may call for heat and warm air is supplied to the downstairs zone. This warm air heats the downstairs, and the heat rises to the upstairs zone. Even though the heat was supplied to the downstairs, the upstairs zone may still get warmer than the downstairs. The duct system in California is tested with both dampers open, which typically allows the system to pass testing as having sufficient airflow. However, for all practical purposes the system fails for the reasons just stated resulting in California being full of duct systems that have insufficient air flow. This insufficient air flow results in lower capacity and efficiency and shortened lifespan for the compressor and blower motor and furnace heat exchanger. Compressors are generally designed to pump vapor not liquid refrigerant. Poor air flow can cause a lack of the refrigerant to become vaporized in the evaporator. A thermal storage system according to an embodiment of the present invention can solve this problem because the compressor's refrigerant circuit (the source circuit) can be routed through the storage/multi-channel heat exchanger rather than through the evaporator that has insufficient heat exchange due to insufficient air flow. A separate channel can be utilized. There is a separate channel that is routed to the load (load channel). This channel can utilize any fluid (liquid, vapor, or multi-phase). Even if a multi-phase refrigerant is used in this load circuit and liquid refrigerant is routed through the evaporator and because of the poor airflow not all of the refrigerant is evaporated, there will be little to no damage to the compressor because the compressor is not a part of the load circuit but in the source circuit. Actually, it would be beneficial if not all of the refrigerant is evaporated because this makes a "flooded evaporator" meaning there is liquid throughout from beginning to end of the evaporator. Flooded evaporators are more efficient because liquid is more effective at removing/adding heat to/from the evaporator tube walls than vapor. This solution has the potential to double the lifespan of compressors by not abusing them in the way that they are currently being abused by the airflow not matching the refrigerant flow.

Example I illustrates an application using hybrid thermal/photovoltaic solar collectors. A multi-channel conduit of three channels is especially well-suited for the use of these hybrid collectors. During summer there are more hours of sunlight throughout a day than in winter, but it could be that the heat load in winter is about the same as or even more than the summertime cooling load. The Solar PV efficiency is 20% on a typical collector, and the array is generally sized to provide enough electricity to drive a compressor for cooling. In contrast, in the winter with its shortened days, the PV component alone does not provide enough electricity to drive a heat pump compressor to provide sufficient heat. The hybrid thermal/PV collectors supply both energy in the form of electricity and in a fluid that is thermally warmed. Because two forms of energy are being absorbed, they can reach efficiencies of 80%. However, to reach this efficiency there must be (with current technology) two forms of energy (electrical and thermal). A multi-channel conduit can be used for this purpose. Channel A could be a part of a source circuit utilizing a refrigerant and heat pump. Therefor the PV part of the hybrid can drive the compressor for the heat pump for both cooling and heating. Channel B could be a load circuit which heats/cools the conditioned space. Channel C could be utilized as a source circuit for heating. The source of the heat would be the hybrid solar collector. During winter there would be the option to heat using either the PV component or the thermal component. And because the efficiency is so much higher when utilizing both components of the hybrid collector, this can solve the problem of being able to get enough heat in winter even though the sun shines much less. In addition, what can enhance the performance of the hybrid-collector and the multi-flow heat exchanger storage system even more would be to use the embodiment shown by way of example in FIGS. 14A and 14B. Referring to this embodiment, Channel A can be used as a source circuit for the heat pump. while Channel B can be used as a load circuit to heat/cool the load. Finally, channel C can be used as a hot fluid channel as a component for circuit C, which gets its heat from the hydronic component of the hybrid solar panels. The current existing technology will not integrate the two fluids, which is the refrigerant channel for the heat pump and the thermal solar heat of the hybrid.

Figure 16:
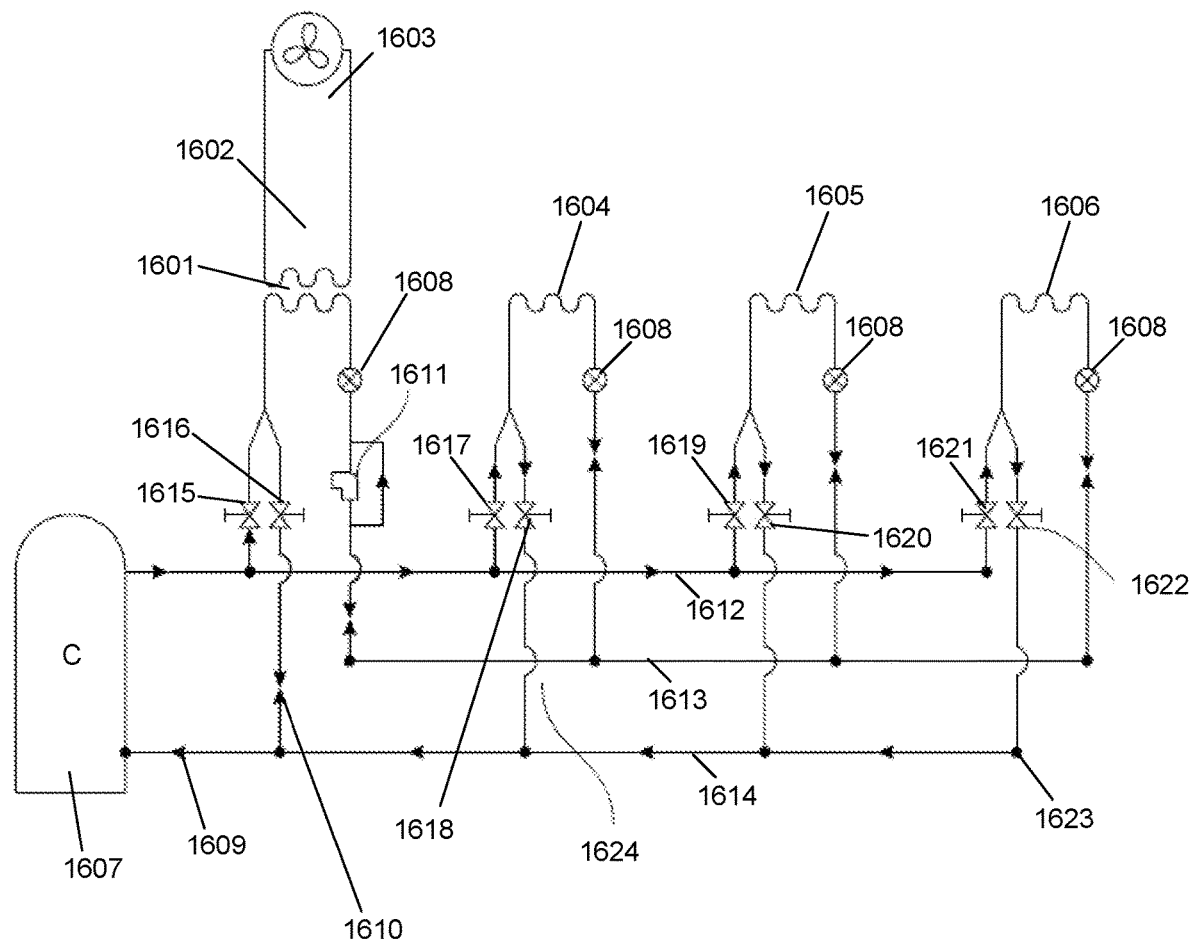
FIG. 16 is a diagram of a multi-flow heat exchanger in use in an exemplary thermal storage application, in accordance with an embodiment of the present invention.

FIG. 16 is a diagram of a multi-flow heat exchanger in use in an exemplary thermal storage application, in accordance with an embodiment of the present invention. In the present embodiment the multi-flow heat exchanger may be used to increase peak load capacity and simultaneously may be used to increase fast charging time of the storage medium and decrease expense at the same time. These functions are illustrated in the following example, Example J, which is a presentation of potential advantages of the multi-flow heat exchanger. Because it works in a parallel operation, the storage medium can be charged (ice make mode if using ice as the pcm) while simultaneously being in discharge mode (ice melt mode). A system in a series operation has much more difficulty if it is attempted to charge and discharge simultaneously because the fluid running through the heat exchanger is either colder than the ice in charging mode so that it can extract heat from the water and freeze it or the fluid can be warmer than the ice in discharging mode (ice melt mode) so that the fluid can extract heat from the ice and melt it. But it cannot be colder than the ice and warmer than the ice at the same time so charging and discharging at the same time is difficult if not impossible in series operation. Being able to charge and directly cool/heat at the same time has many advantages. Referring to FIG. 16, a common Variable Refrigerant Flow VRF is shown with 2 indoor fan coils (aka heads) 1604 and 1605 with a capacity of 3 tons each head, an outdoor heat exchanger 1606 with a capacity of only 3 tons, and a compressor 1607 with a capacity of 3 tons. The combined capacity of heads 1604 and 1605 together is 6 tons, but the capacity of the VRF compressor 1607 is only 3 tons. The multi-flow heat exchanger 1601 comprises a source circuit A 1602 with a 5-ton condenser 1603. There are 4 metering devices 1608. The arrow 1609 shows one-way flow, and the double arrow 1610 shows where there is two-way refrigerant flow. A refrigerant pump 1611 may be used when the condensing temperature/pressure in the multi-flow heat exchanger 1601 is below the evaporating temperature/pressure in one or both of the heads 1604 and 1605. VFR compressor 1607 is connected to a discharge line 1612, a liquid line 1613 and a suction line 1614. 1615, 1616, 1617, 1618, 1619, 1620, 1621, 1622 refer to refrigerant control valves. Control valves 1615, 1617, 1619 and 1621 control the discharge lines, and control valves 1616, 1618, 1620 and 1622 control the suction lines for the VRF compressor 1607. This is a useful system, and it can do heat recovery. For example, without limitation, if all valves are closed except control valves 1617 and 1620, the head 1604 will become the condenser and the head 1605 will become the evaporator, and this will utilize heat from head 1605, which was gained by refrigerant evaporation, to provide heat to head 1604. 1623 shows a refrigerant line connection, and 1624 shows a refrigerant line bypass where there is no connection. When the system is in discharge cooling mode with the compressor off, pump 1610 will be operational and valve 1616 will be open and either or both valves 1618 and 1620 will be open. In peak cooling mode with the compressor and pump operating, valves 1616, 1618, 1620, 1621 will be open and the outdoor heat exchanger 1606 will be operating as the condensing heat exchanger for the VRF system and the condenser 1603 may be providing additional cooling by being in charge mode for the storage medium.

In a scenario where a building gets its power from a micro-grid which is powered mainly by solar energy, the building's peak load needs 6 tons of cooling from 12:00 μm to 10:00 pm, but the best solar output is from 10:00 am to 4:00 pm. Therefore, it is preferable to charge the storage medium during the time that the solar panels are producing and meet peak load demand all at once. The 3-ton VRF compressor 1607 is not enough capacity, therefore the additional cooling of 30 ton-hours will need to come from the multi-flow heat exchanger 1601. The 5-ton condenser 1603 can make enough ice from 10:00 am to 4:00 pm (5 tons×6 hours=30 ton-hours). The peak usage time from 12:00 pm to 10:00 pm overlaps with the peak solar output hours, but because of the stable equilibrium this is typically not a problem. During peak usage cooling time, the refrigerant pump 1611 will supply liquid refrigerant that was condensed in the multi-flow heat exchanger 1601 for the value of 3 tons of liquid refrigerant, and the outdoor heat exchanger 1606 will supply the other 3 tons with the use of the VRF compressor 1607. This is considered advantageous because the condenser 1603 can be a simple, inexpensive off-on (non VRF) compressor compared to the expense of an 8-ton VRF compressor and outdoor heat exchanger. Because of the Stable Equilibrium, which is innate in the nature of this thermal storage system, there is really no need to use an expensive VRF compressor. Additionally, an 8-ton VRF usually can only reduce its capacity to 35%, which is not enough reduction to accommodate the low loads that will occur. However, the 3-ton VRF compressor at 35% will be able to accommodate the ultra-low load that will occur, which may result in greater efficiency, comfort, and quietness. The 5-ton condenser will be able to supply the huge spike in demanded output from needing to charge the storage medium and meet peak cooling demand all at once. Solar energy production typically becomes valuable by harvesting and storing the energy when the sun is high in the sky. Embodiments of the present invention can be used with VRF systems to exploit this to great advantage.

These examples are just a small sample of the potential uses of embodiments of Integrated Multi-Flow, Multi-Media storage systems. This system was designed to be versatile and have more simplicity than current systems. The benefits and improvement to the existing technology that may be provided by embodiments of the present invention are many. The design of many embodiments may provide simplification as well as an improvement over many current designs. There can be a power in simplistic engineering that can potentially lead to widespread use of the technology by making it cost effective. Some embodiments of the Multi-Flow Heat Exchanger combine two heat exchangers (a refrigerant to glycol heat exchanger with a glycol to ice heat exchanger) from a conventional closed loop internal-melt into one heat exchanger. This is an economization of materials as well as an economization of expense. This also increases efficiency because of the efficiency loss that must accompany each additional heat exchanging process. According to the law of thermal dynamics each process must lose some efficiency and by eliminating a process of cooling/heating a fluid in one heat exchanger by combining two processes into one heat exchanger, efficiency is increased. The Multi-Flow Heat Exchanger in one embodiment can be made in a modular design that can be used with small residential systems or scaled up easily by either enlarging the heat exchanger or by adding a number of heat exchangers, in a parallel circuit, together to meet the capacity requirement. This is a closed system and therefore a reduced maintenance system compared to an open loop system, which may make this heat exchanger/storage system less maintenance intensive for homes and smaller facilities that may not have the maintenance staff that regularly attend to the equipment. The simplicity of the system may also lead to reduced installation cost. It is believed that these benefits, especially the cost effectiveness and lower maintenance, of these systems can make it more viable to get Thermal Energy Storage into widespread use.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allow ability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a multi-flow heat exchanger according to the present invention will be apparent to those skilled in the art. Various aspects of the invention have been described above by way of illustration, and the specific embodiments disclosed are not intended to limit the invention to the particular forms disclosed. The particular implementation of the multi-flow heat exchanger may vary depending upon the particular context or application. By way of example, and not limitation, the multi-flow heat exchanger described in the foregoing were principally directed to heating, ventilation, and air conditioning (HVAC) implementations; however, similar techniques may instead be applied to cooling large electronics, industrial applications, heat storage from concentrated solar panels used to expand steam for generating electricity, and food processing applications which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A system comprising:
   a heat exchanger with two or more channels;
   one or more source channels, wherein said one or more source channels are enclosed for containing and channeling a heat-bearing fluid through said heat exchanger;
   wherein said one or more source channels are configured as integrated components of complete source circuits, thereby being operable for conveying said heat-bearing fluid to and from heat and cold sources and to and from said heat exchanger;

one or more load channels, wherein said one or more load channels are enclosed for containing and channeling a said heat-bearing fluid through said heat exchanger;

wherein said one or more load channels are configured as components of complete load circuits, thereby being operable for conveying said heat-bearing fluid from either source and load channels;

wherein said conveyed fluid is configured to flow heat or cold to and from said heat exchanger;

an integral thermal storage that is configured to be operably used as a sensible heat storage, latent heat storage, or a combination of sensible heat storage and latent heat storage; and wherein said one or more source channels, said one or more load channels, and said thermal storage are configured to be in intimate thermal communication with one another for the purpose of exchanging heat in all flow-directions.

2. The system according to claim 1, wherein said source circuits are configured to be in operation without simultaneous operation of said load circuits, said load circuits are configured to be in operation without the simultaneous operation of said source circuits.

3. The system according to claim 1, further comprising means for enabling said source circuits and said load circuits to operate in a variation of combinations of selected load circuit(s) and selected source circuit(s) depending on the needs of the system at a particular time.

4. The system according to claim 1, further comprising means for controlling said source circuits and said load circuits to enable said load circuits and said source circuits to alternate between being load circuits and being source circuits.

5. The system according to claim 1, wherein said source circuits and said load circuits are configured to be operable to function as both source circuits and load circuits simultaneously when in an energy recovery mode.

6. The system according to claim 1, further comprising a heat mode system in which said source circuit adds heat to said heat exchanger and a cooling mode system, wherein said source circuit extracts heat from said heat exchanger.

7. The system according to claim 1, further comprising a heat mode system that is configured to be operable for said load circuit to extracts heat from said heat exchanger and a cooling mode system, wherein said load circuit adds heat to said heat exchanger.

8. The system according to claim 1, further comprising a multiple phase change materials configured to be operable to serve heating or cooling needs of said system using the same system equipment.

9. The system according to claim 1, further comprising a heat recovery system.

10. The system according to claim 1, further comprising a combination of compressors and liquid refrigerant pumps, which are configured to be operable to achieve heat recovery.

11. The system according to claim 1, further comprising means for recovering heat from an inner part of a building to be distributed to conditioned spaces near a periphery shell of the building that need heat in winter.

12. The system according to claim 1, futher further comprising means for a zoned heating and cooling in which a first zone is used to heat a second zone resulting in the cooling of the first zone as the heat is taken from the first zone to heat the second zone.

13. The system according to claim 1, further comprising means for said heat exchanger to use one zone to heat another zone resulting in cooling a zone and using this heat to warm another zone without using compressors.

* * * * *